(12) United States Patent
Tillkorn et al.

(10) Patent No.: US 11,796,720 B2
(45) Date of Patent: Oct. 24, 2023

(54) APPARATUS, LASER SYSTEM AND METHOD FOR COMBINING COHERENT LASER BEAMS

(71) Applicant: TRUMPF Laser GmbH, Schramberg (DE)

(72) Inventors: Christoph Tillkorn, Villingendorf (DE); Daniel Flamm, Kornwestheim (DE); Florian Jansen, Villingen-Schwenningen (DE); Torsten Beck, Stuttgart (DE); Hans-Juergen Otto, Schramberg (DE); Julian Hellstern, Rottweil (DE); Andreas Heimes, Renningen (DE); Maike Prossotowicz, Aichhalden (DE)

(73) Assignee: TRUMPF LASER GMBH, Schramberg (DE)

( * ) Notice: Subject to any disclaimer, the term of this patent is extended or adjusted under 35 U.S.C. 154(b) by 345 days.

(21) Appl. No.: 17/149,763

(22) Filed: Jan. 15, 2021

(65) Prior Publication Data
US 2021/0165135 A1    Jun. 3, 2021

Related U.S. Application Data

(63) Continuation of application No. PCT/EP2019/069324, filed on Jul. 18, 2019.

(30) Foreign Application Priority Data

Jul. 18, 2018 (DE) .................... 10 2018 211 971.6

(51) Int. Cl.
*G02B 3/00* (2006.01)
*G02B 27/12* (2006.01)
(Continued)

(52) U.S. Cl.
CPC ............. *G02B 3/0037* (2013.01); *G02B 3/04* (2013.01); *G02B 27/123* (2013.01); *G02B 27/30* (2013.01)

(58) Field of Classification Search
CPC ...... G02B 3/0037; G02B 3/04; G02B 27/123; G02B 27/30; H01S 3/10; H01S 3/10053; H01S 3/1307
(Continued)

(56) References Cited

U.S. PATENT DOCUMENTS 7,733,930 B2 *   6/2010   Livingston ......... B23K 26/0613
                                                    372/102
7,756,169 B2 *   7/2010   Livingston ............ H01S 3/1305
                                                    372/102
(Continued)

FOREIGN PATENT DOCUMENTS

CN    101238735 A    8/2008
CN    203149208 U    8/2013
(Continued)

OTHER PUBLICATIONS

Zimmerman, et al., "Refractive Micro-Optics for Multi-Spot and Multi-Line Generation," Proceedings of LPM2008—the 9th International Symposium on Laser Precision Microfabrication, Dec. 1-5, 2008, Japan Laser Processing Society, Osaka, Japan.
(Continued)

*Primary Examiner* — Zachary W Wilkes
(74) *Attorney, Agent, or Firm* — LEYDIG, VOIT & MAYER, LTD.

(57) ABSTRACT

An apparatus for combining a plurality of coherent laser beams includes at least N−1 phase setting devices configured to set a respective phase ($\delta\varphi_n$) of a respective one of the plurality of coherent laser beams, and a beam combination device configured to combine the plurality of coherent laser
(Continued)

beams to form at least one combined laser beam. The beam combination device includes a microlens arrangement having at least two microlens arrays configured to form the at least one combined laser beam.

28 Claims, 6 Drawing Sheets

(51) Int. Cl.
   *G02B 27/30* (2006.01)
   *G02B 3/04* (2006.01)
(58) Field of Classification Search
   USPC ..................................... 359/639; 372/29.016
   See application file for complete search history.

(56) References Cited

U.S. PATENT DOCUMENTS

| | | | |
|---|---|---|---|
| 7,924,894 B2 | 4/2011 | Livingston | |
| 8,248,700 B1 | 8/2012 | Zorabedian | |
| 8,792,526 B2* | 7/2014 | Goodno | H01S 3/2383 |
| | | | 372/29.016 |
| 11,296,477 B2* | 4/2022 | Beresnev | G02B 27/0927 |
| 2005/0201429 A1 | 9/2005 | Komine et al. | |
| 2008/0204847 A1 | 8/2008 | Kamm et al. | |
| 2009/0034042 A1* | 2/2009 | Tholl | G02B 26/06 |
| 2010/0033829 A1 | 2/2010 | Wippermann et al. | |
| 2010/0328773 A1 | 12/2010 | Chen et al. | |
| 2011/0157706 A1* | 6/2011 | Mitra | G02B 27/0927 |
| | | | 359/639 |
| 2012/0236212 A1 | 9/2012 | Itoh et al. | |
| 2013/0107343 A1 | 5/2013 | Shekel | |
| 2017/0201063 A1 | 7/2017 | Bourderionnet et al. | |
| 2017/0299958 A1 | 10/2017 | Kawasumi | |
| 2018/0269648 A1* | 9/2018 | Robinson | H01S 3/10053 |

FOREIGN PATENT DOCUMENTS

| | | |
|---|---|---|
| JP | 2009294249 A | 12/2009 |
| TW | 201100862 A | 1/2011 |

OTHER PUBLICATIONS

Yu C X et al, "Coherent beam combining of large number of PM fibres in 2-D fibre array," Electronics Letters, Aug. 2006, pp. 1024-1025, vol. 42, No. 18, Institution of Engineering and Technology, Stevenage, UK.

* cited by examiner

APPARATUS, LASER SYSTEM AND METHOD FOR COMBINING COHERENT LASER BEAMS

CROSS-REFERENCE TO PRIOR APPLICATIONS

This application is a continuation of International Patent Application No. PCT/EP2019/069324, filed on Jul. 18, 2019, which claims priority to German Patent Application No. DE 10 2018 211 971.6, filed on Jul. 18, 2018. The entire disclosure of both applications is hereby incorporated by reference herein.

FIELD

The disclosure relates to an apparatus for combining a plurality N of coherent laser beams, comprising: at least N−1 phase setting devices for setting a respective phase of one of the coherent laser beams, and a beam combination device for combining the coherent laser beams to form at least one, in particular exactly one, combined laser beam. The present disclosure also relates to a laser system comprising: at least one laser source for generating the plurality of coherent laser beams, in particular ultrashort pulse laser beams, a plurality of emission surfaces for emitting the plurality of coherent laser beams, and an above-described apparatus for combining the plurality of coherent laser beams. The disclosure further relates to a method for combining coherent laser beams.

BACKGROUND

Within the meaning of this application, "coherent laser beams" is understood to mean a temporal coherence of the laser beams with respect to one another. In general, the laser beams can have a reduced degree of spatial coherence, i.e., the laser beams can be partly spatially coherent, i.e., these are not necessarily single mode laser beams. By way of example, the laser beams can be produced by multimode sources and, for example, form a higher mode Gaussian mode, e.g., a Laguerre-Gaussian mode, a Hermite-Gaussian mode or superpositions thereof. However, the laser beams are preferably coherent in both time and space.

In the case of beam combination, a plurality of laser beams are superposed to form a combined laser beam which has an accordingly higher power. In the case of the coherent "tiled aperture" beam combination, also referred to as side-by-side beam combination, the beam cross section of the combined laser beam is increased but the divergence is reduced; as a rule, this is not possible without a loss of power or beam quality. In the case of the coherent "filled aperture" beam combination, a plurality of laser beams are superposed to form a combined laser beam, which typically has the same beam cross section and, ideally, the same divergence as an individual laser beam. Such a beam combination can be implemented—almost without any loss of beam quality—in diffractive or interferometric fashion or by way of polarization coupling.

US 2017/0201063 A1 describes a system for adapting the phase of a number M of laser sources, which are arranged in a periodic spatial configuration. The system comprises means for collimating and aligning the number M of laser beams at a combining diffractive optical element, which comprises a phase grating. The diffractive optical element is arranged in an object plane of a Fourier lens. The system also comprises means for adapting the phase of the laser sources on the basis of a negative feedback signal, which originates from the combined laser beams.

U.S. Pat. No. 7,924,894 B2 has disclosed a high-power laser system, which comprises a master oscillator and a plurality of fiber laser amplifiers for generating output beamlets. A diffractive optical element combines the output beamlets to form a combined output beam. A closed-loop control device serves to minimize errors that can be traced back to the combination of the output beamlets, which errors reduce the quality of the combined output beam. The phase of the beamlets is set on the basis of an error signal with the aid of phase modulators.

U.S. Pat. No. 8,248,700 B1 has described systems and methods of coherent beam combination. The system comprises an array of coherent laser emitters, which generate an array of output beams, which are collimated by an array of collimation lenses. The collimated output beams are focused in a focal plane by a lens, a phase screen being arranged in said focal plane in order to generate one or more coherently superposed beams from the array of output beams, said beams corresponding to a phase combination of the array of output beams. The phase screen can be a diffractive optical element.

SUMMARY

In an embodiment, the present invention provides an apparatus for combining a plurality of coherent laser beams. The apparatus includes at least N−1 phase setting devices configured to set a respective phase ($\delta\varphi_n$) of a respective one of the plurality of coherent laser beams, and a beam combination device configured to combine the plurality of coherent laser beams to form at least one combined laser beam. The beam combination device includes a microlens arrangement having at least two microlens arrays configured to form the at least one combined laser beam.

BRIEF DESCRIPTION OF THE DRAWINGS

Embodiments of the present disclosure will be described in even greater detail below based on the exemplary figures. The present invention is not limited to the exemplary embodiments. All features described and/or illustrated herein can be used alone or combined in different combinations in embodiments of the present invention. The features and advantages of various embodiments will become apparent by reading the following detailed description with reference to the attached drawings which illustrate the following.

DETAILED DESCRIPTION

Figure 1:
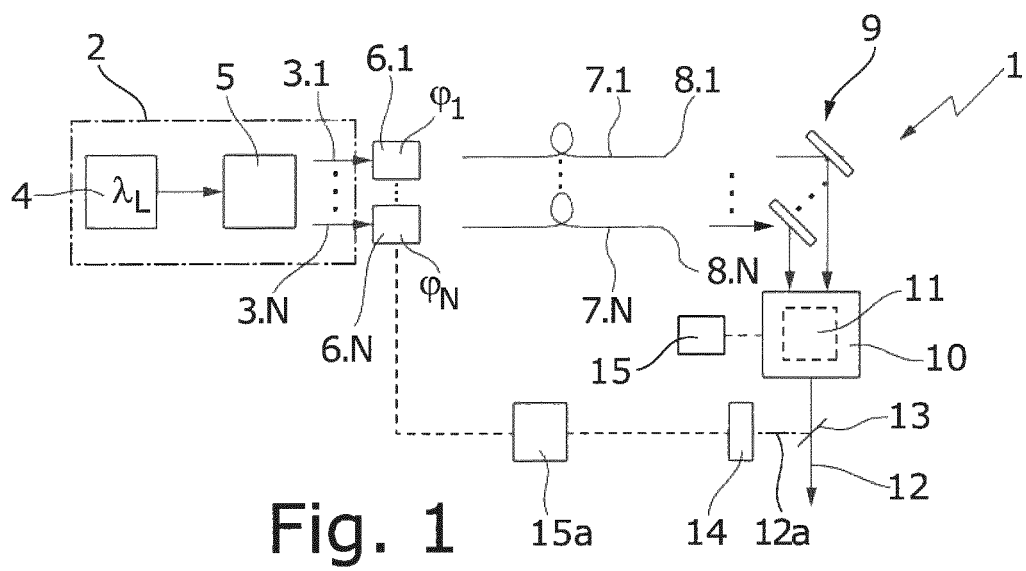
FIG. 1 shows a schematic illustration of a laser system with an apparatus for combining a plurality of coherent laser beams to form a combined laser beam.

The present disclosure provides an apparatus for combining a plurality of coherent laser beams, a laser system comprising such an apparatus, and an associated method, which allow to virtually completely maintain the beam quality of a respective individual laser beam in the at least one combined coherent laser beam.

According to the disclosure, an apparatus of the type set forth at the outset is provided, in which the beam combination device comprises a microlens arrangement with at least two microlens arrays for forming the at least one combined laser beam.

The inventors have identified that a microlens arrangement can be used as a beam combination device for the coherent combination of the plurality of coherent laser beams to form at least one combined laser beam with a high beam quality if the (relative) phase or the phase differences between the coherent laser beams is or are suitably set. Although the use of a microlens arrangement or an imaging homogenizer for homogenizing radiation, in particular for homogenizing a laser beam, is known in principle, the microlens arrangement is however used, according to the disclosure, for the coherent combination of a plurality of laser beams. Moreover, a high coupling efficiency can be realized in the case of a suitable design of the microlens arrangement, for example in the case of a suitable choice of the focal lengths of the microlenses of the microlens array, and in the case of a suitable adaptation of the phase front of the laser beams that are radiated at the microlens arrangement, in particular by a suitable choice of the (relative) phases $\delta\varphi_n$ of the coherent laser beams.

In principle, it is possible to realize the phase adaptation exclusively by a suitable input coupling optical unit for coupling the coherent laser beams into the microlens arrangement, i.e., by one or more suitably designed optical elements. In practice, the phase setting devices are typically used for individually setting the (relative) phases $\delta\varphi_n$ of the coherent laser beams. Additionally, a suitable input coupling optical unit can be used in combination in order to undertake the phase adaptation. This is advantageous since the phase setting devices are required in any case, as a rule, in order to correct or regulate the phases of the coherent laser beams, for example in order to compensate temperature-related influences on the apparatus.

The phase setting devices serve to set the respective phase of the coherent laser beams, typically before the emergence thereof at an emission surface, i.e., before these laser beams are incident on the microlens arrangement in free-beam propagation. There are a multiplicity of options for realizing the phase setting devices, which are typically embodied to set a variable phase retardation: By way of example, the phase setting devices can be modulators in the form of EOMs (electro-optic modulators), SLMs (spatial light modulators), optical delay lines in the form of mirror arrangements, or the like. Should the coherent laser beams be guided in a fiber prior to the emission at an emission surface, it is possible, e.g., by means of piezo actuators, to apply a tension to the fiber, to influence the temperature of the fiber, etc., for setting the phase.

In the case where coherent laser beams are guided in a gain medium and optically amplified prior to the emission at an emission surface, the specific gain characteristic of the respective optical amplifier can be adapted, and consequently it is possible to set a phase relationship between the individual channels or the individual laser beams. Here, the gain characteristic can represent the overall gain obtained and/or the absolute output power of the coherent individual beams obtained. Here, the reason for a different phase relationship can lie in the different number of excited laser-active ions in the gain medium or else in different optical intensity curves, which lead to a change in the phase angle as a result of optical nonlinearity either in the gain medium itself or in a further optical element.

Preferably, the coherent laser beams and the microlens arrangement satisfy the following equation:

$$N = p^2/(\lambda_L f_E) \tag{1}$$

where N denotes the number of coherent laser beams for the combination, p denotes a grid spacing of the microlenses of a respective microlens array, $\lambda_L$ denotes the (as a rule identical) laser wavelength of the coherent laser beams and $f_E$ denotes the (effective) focal length of the microlens arrangement. In the simplest case, the microlens arrangement comprises two microlens arrays with an identical focal length, which are arranged at the distance of their focal lengths from one another. In this case, the focal length of the microlens arrangement corresponds to the (common) focal length of the two microlens arrays.

The inventors have recognized that the beam quality of a single coherent laser beam is virtually completely maintained during the combination to the combined laser beam if the aforementioned equation (1) is satisfied. What is exploited here is that a microlens arrangement or an imaging homogenizer, which is irradiated by a coherent, collimated laser beam, generates a diffraction pattern with N diffraction spots of the same intensity in the case where equation (1) is satisfied; cf. the article M. Zimmermann et al. "Refractive Micro-optics for Multi-spot and Multi-line Generation", Proceedings of LPM2008—the 9th International Symposium on Laser Precision Microfabrication. The inventors propose that the beam path through the imaging homogenizer be reversed and the emission surfaces for the emission of the coherent laser beams be arranged or the coherent laser beams be emitted in the direction of the microlens arrangement at the positions where the diffraction spots are generated in the cited article. If the coherent laser beams have (approximately) the same intensity, a combined, coherent laser beam with a high beam quality is generated when the beam direction is reversed.

It is understood that equation (1) cannot be adhered to exactly in practice. The beam quality of the superposed laser beam deteriorates in the case where there are deviations from equation (1). Within the meaning of this application, the aforementioned equation (1) is considered satisfied if the right-hand side of equation (1) deviates by no more than 20%, preferably by no more than 10%, in particular by no more than 5% from the (integer) value N on the left-hand side of equation (1), i.e., if the following applies: $|N-p^2/(\lambda_L f_E)|<0.2$, preferably $<0.1$, in particular $<0.05$.

In one embodiment, the microlens arrangement comprises at least three microlens arrays and is embodied to set its (effective) focal length $f_E$. Setting the focal length of the microlens arrangement is required if the number N of coherent laser beams which are used for the combination is altered and, furthermore, equation (1) should be satisfied since the other parameters in equation (1), i.e., the laser wavelength $\lambda_L$ and the grid spacing p of the microlenses, cannot readily be altered.

The effective focal length $f_E$ of the microlens arrangement relates to a bundle of rays which in each case passes through one microlens per microlens array in the beam path (corresponding to a sub-aperture). A microlens arrangement which can be used as beam combination device in the apparatus typically has the following properties in relation to a bundle of rays for respectively one microlens per microlens array when written in matrix optics, i.e., as an imaging matrix $$\begin{pmatrix} A & B \\ C & D \end{pmatrix},$$

$A=0$; $|B|=f_E$. Furthermore, $D<1$ usually also applies (for a substantially collimated output beam); C then arises on the basis of A, B and D. The use of at least three microlens arrays is necessary for satisfying the second condition $|B|=f_E$ for variable $f_E$.

In the simplest case, a respective microlens array of the microlens arrangement is realized by a dedicated multilens array component. It is also possible for a plurality of microlens arrays in the beam path to be realized by a single microlens array component by virtue of the beam path correspondingly running through this microlens array component multiple times, for example because the beam path is deflected at a reflecting optical element.

There are various options for setting the effective focal length of the microlens arrangement:

In one development, the microlens arrangement is embodied, for the purposes of setting its (effective) focal length, to alter an (optical) distance between at least one first microlens array and a second microlens array. For two (thin) (micro-)lenses it is possible, for example, to determine an effective focal length $f_E$ from the focal lengths of the single lenses $f_{1a}$, $f_{2a}$ and the distance ds between the lenses, in accordance with the basic relationship:

$$\frac{1}{f_E} = \frac{1}{f_{1a}} + \frac{1}{f_{2a}} - \frac{ds}{f_{1a} * f_{2a}}. \quad (2)$$

From this basic relationship, it is possible to determine (iteratively if necessary) the effective focal length $f_E$ of a microlens arrangement with any number of microlens arrays (as a rule, three or four microlens arrays). Since changing the number of coherent laser beams used for the combination is not usually time critical, setting or varying the effective focal length of the microlens arrangement can be carried out manually where necessary by virtue of the microlens arrays being moved to specified adjustment positions. Optionally, the apparatus can comprise a motor-driven adjustment mechanism and an electronic control device in order to automatically approach the various adjustment positions. The adjustment mechanism can comprise a carriage on which a microlens array or a microlens array component or at least two microlens array components are arranged at a fixed distance. The carriage can have a displaceable embodiment in relation to at least one further microlens array component, in particular in relation to at least two microlens array components, along the beam propagation direction. By way of example, a first and third microlens array can be arranged in fixed fashion in the beam path and a second and fourth microlens array can be arranged on the displaceable carriage in the beam path, or vice versa.

To combine the coherent laser beams to form a combined laser beam, it is typically necessary or advantageous for adjacent coherent laser beams to be coupled into the microlens arrangement with a specified angle difference $\delta\theta$, to which the following applies: $\delta\theta=\lambda_L/p$, where denotes the laser wavelength and p denotes an (identical) grid spacing of the microlenses of a respective microlens array. To satisfy this condition, the emission surfaces from which the coherent laser beams emerge can be aligned at the respective angle difference $\delta\theta$ with respect to one another and, for example, be arranged on a circular arc. In this case, the coherent laser beams can be focused with the aid of individual lenses, for example, which are arranged in the respective beam path of one of the coherent laser beams; however, the provision of such lenses can also be dispensed with where applicable.

In a further embodiment, the apparatus comprises a movement device for generating a preferably adjustable lateral offset between at least one first microlens array and at least one second microlens array of the microlens arrangement. As a result of the movement device, the grids in which the microlenses of the two microlens arrays are arranged are displaced laterally, i.e., perpendicular to the propagation direction of the combined laser beam or the optical axis, along which the microlens arrays are arranged at a distance from one another. As a rule, the lateral displacement is not implemented by an integer multiple of the grid spacing of the microlenses, and so microlenses or sub-apertures following one another in the propagation direction are laterally offset from one another. Depending on the size or the absolute value of the lateral offset, it is possible to implement a targeted deflection of the combined laser beam or a beam split to form two or more combined laser beams, which, as a rule, have the same power. The laser power and the beam quality of the individual coherent laser beams can be substantially maintained in the process. As a result of the lateral offset, the optical parameters which serve to form an individual combined laser beam can be altered in such a way that a combination of a plurality of well-defined bundles (beam splitting) of laser beams with an equally distributed power arises. As an alternative or in addition thereto, a single laser beam can be formed by the combination, said single laser beam propagating with a parallel offset from the optical axis (beam deflection), provided the angle distribution of the far field is imaged with a lens or the like and converted into a spatial distribution in the process. This method for beam splitting and/or beam deflection can be realized in the case of control rates <<1 kHz.

The movement device typically serves to laterally displace one of the microlens arrays. The movement device can comprise a piezo-element, a voice coil, a mechanical device, optionally in the form of a cam shaft, etc., or consist of such a component, for the misalignment or for the displacement of the at least one microlens array.

In one development, the first and the second microlens array have a lateral offset $\Delta$ for the purposes of forming two combined laser beams, the following applying to said lateral offset:

$$\Delta = \pm p/(2N),$$

where N denotes the number of coherent laser beams, and p denotes a grid spacing of the microlenses of a respective microlens array.

In this case, the microlenses of the first microlens array are offset by the absolute value $\Delta$ in one direction (e.g., X-direction) with respect to the microlenses of the second microlens array. The two combined laser beams or the two orders of diffraction into which the latter are diffracted are likewise offset in the X-direction.

In a further development, the first and the second microlens array have a lateral offset $\Delta$ for the purposes of combining an even number N of coherent laser beams to form a combined laser beam, the following applying to said lateral offset:

$$\Delta = \pm p/(2N+1),$$

where N denotes the number of coherent laser beams and p denotes a grid spacing of the microlenses of a respective microlens array, wherein the following applies to a preferably adjustable distance d between the first microlens array and the second microlens array:

$$d = p^2/(N\lambda_L),$$

where $\lambda_L$ denotes the laser wavelength. The distance d between the two laterally offset microlens arrays can be set, as a rule, in the manner described further above in conjunction with setting the effective focal length $f_E$ of the microlens arrangement by means of a motor-driven adjustment mechanism; however, it is also possible for the distance d between the two microlens arrays to be constant and unable to be altered.

In a further development, the first and the second microlens array have a lateral offset $\Delta$ for the purposes of forming a combined laser beam which is diffracted into an order of diffraction B that differs from the zeroth order, the following applying to said lateral offset:

$$\Delta = p/NB,$$

where N denotes the number of coherent laser beams, and p denotes a grid spacing of the microlenses of a respective microlens array. The order of diffraction B assumes integer, nonzero values, i.e., B=±1, ±2, . . . . As a result of the lateral offset $\Delta$, there can be in this case a deflection of the combined laser beam into a certain order of diffraction, i.e., at a specified angle corresponding to this order of diffraction. The intensity of the diffracted combined laser beam reduces depending on the order of diffraction, for example by approximately 3% in the case of the ±1st order of diffraction and by approximately 10% in the case of the ±2nd order of diffraction; i.e., the efficiency in the beam combination is also high in this case.

In the case where a plurality of laser beams are intended to be combined in two dimensions to form a common laser beam and the microlens arrangement comprises for this purpose two pairs of one-dimensional crossed microlens arrays arranged directly in succession, the movement device can be used to set a separately adjustable lateral offset of the microlenses of a respective one-dimensional microlens array in two different, for example perpendicular, directions (X, Y).

In the case where two-dimensionally structured microlens arrays are used for the two-dimensional combination, it is not possible to independently set the lateral offset in two directions. If such a two-dimensionally structured microlens array is laterally offset in one direction (e.g., X-direction), the combined laser beam is also deflected in the second direction (e.g., Y-direction) or four combined laser beams are formed instead of two combined laser beams.

In a further embodiment, the apparatus comprises an input coupling optical unit for coupling the coherent laser beams into the microlens arrangement, when the input coupling optical unit is preferably embodied to couple adjacent coherent laser beams into the microlens arrangement with a specified angle difference $\delta\theta$, to which the following applies: $\delta\theta = \lambda_L/p$, where $\lambda_L$ denotes the laser wavelength and p denotes a grid spacing of the microlenses of a respective microlens array. In this case, use is made of an input coupling optical unit which is arranged between the emission surfaces, from which the coherent laser beams emerge, and the microlens arrangement. The input coupling optical unit is not mandatory but may be advantageous, for example when setting up the apparatus. In particular, the input coupling optical unit can be used to satisfy the requirement in respect of the angle difference $\delta\theta$ without, for this purpose, the beam emergence directions of the coherent laser beams from the emitter surfaces having to be aligned at an angle with respect to one another. By way of example, the emitter surfaces can be arranged on a line in this case, i.e., the beam emergence directions or the Poynting vectors of the coherent laser beams are aligned parallel to one another. The use or design of the input coupling optical unit and the arrangement of the emitter surfaces depend on the boundary conditions, for example on the laser source used. By way of example, the case where the emitter surfaces form the end sides of fibers extending in parallel lends itself to the use of an input coupling optical unit.

In one development, the input coupling optical unit comprises at least one focusing device, in particular at least one focusing lens, for focusing the plurality of coherent laser beams on the microlens arrangement. The use of a focusing lens which is arranged at a distance from the microlens arrangement that substantially equals its focal length (Fourier lens) was found to be advantageous in order to satisfy the condition in respect of the angle difference $\delta\theta$, provided the emission surfaces are arranged at a suitable distance from one another. In this case, the coherent laser beams can be incident on the focusing lens in a manner aligned substantially parallel to one another and are focused on the microlens arrangement.

In one development, the input coupling optical unit comprises at least one further imaging optical unit, in particular at least one further lens, for correcting a curvature of the phase front of the plurality of coherent laser beams. As described further above, at least part of the relevant phase of the coherent laser beams, which is required for the coherent combination, can be set with the aid of an optical unit which comprises one or more optical elements. Setting an absolute portion (i.e., a portion that is not dependent on the respective laser beam) of the phase front of the laser beams can be considered a correction of the phase front curvature. However, the use of a (further) optical unit for correcting the phase front is not mandatory if the apparatus, in particular the input coupling optical unit, has a suitable design (see below). The further optical unit is typically arranged in the beam path of the coherent laser beams upstream of the focusing device.

A further aspect of the disclosure relates to a laser system comprising: at least one laser source for generating the plurality of coherent laser beams, a plurality of emission surfaces for emitting the plurality of coherent laser beams, and an above-described apparatus for combining the plurality of coherent laser beams to form a combined laser beam. To generate the plurality of coherent laser beams, the laser source can have a single laser, for example in the form of a (fiber) master oscillator. The seed laser radiation generated by the laser is divided into the plurality N of laser beams, for example by means of a conventional 1-to-N coupling device, for example in the form of a single microlens array. Alternatively, a plurality of laser sources, for example in the form of fiber oscillators, laser diodes, etc., can serve to generate the plurality N of coherent laser beams. In this case, the laser system comprises a control device for driving the laser diodes to generate the coherent laser beams. The laser source(s) can be embodied to generate ultrashort pulse laser beams, i.e., coherent laser beams that have a pulse duration of less than, e.g., $10^{-12}$ s.

The coherent laser beams generated in the laser source or sources are typically guided to the emission surfaces with the aid of a plurality N of beam guiding devices, for example in the form of fibers. The individual beam guidance of the laser beams renders it possible to act on these individually in order to suitably set the relative phases with the aid of the phase setting device. The beam guiding devices can comprise a corresponding plurality N of amplifiers or amplifier chains, for example in the form of fiber amplifiers, in order to amplify the laser beams before these are emitted at the emitter surfaces in the direction of the microlens arrangement. The phase setting devices can be arranged in the beam path upstream or downstream of the beam guiding devices and/or can act on the beam guiding devices, e.g., in the form of the fibers. The advantage of such a laser system of individual amplifiers not only consists in achieving higher laser powers but also in that errors which accumulate in the amplifier setup influence each of the coherent laser beams differently and are therefore averaged out when forming the combined laser beam.

In a further embodiment, the coherent laser beams emitted at the emission surfaces have a Gaussian beam profile, a donut-shaped beam profile or a top hat beam profile. As described further above, the temporal coherence of the laser beams is important for the superposition; however, the laser beams can be generated by spatially partly coherent laser sources, for example by multimode laser sources. Expressed differently, the coherent laser beams are not necessarily single mode laser beams which are superposed in the microlens arrangement to form a combined single mode laser beam with a greater beam diameter. In the diffraction pattern or the multi-spot profile generated by the microlens arrangement when the latter is passed by a substantially collimated laser beam in the reverse beam direction, the individual spots have, for example, a substantially Gaussian beam profile, a substantially donut-shaped beam profile or a substantially top hat-shaped beam profile. However, as a rule, it is advantageous if the coherent laser beams which are used for the coherent combination are single mode laser beams which are combined to form a single mode laser beam. Since a homogeneous distribution of N individual spots is generated when equation (1) is observed, the intensity levels of the coherent laser beams emerging from the emitter surfaces should also be as homogeneous as possible, i.e., of the same size.

In a further embodiment, the laser system comprises a control device, which is embodied or programmed to set the (effective) focal length of the microlens arrangement on the basis of the number N of emitted coherent laser beams. By way of example, the number of emitted coherent laser beams can change if additional laser sources are installed into the laser system or if laser sources are removed from the laser system. The laser system described here is a scalable system; i.e., any number of coherent laser beams can be superposed in principle. By adapting the (effective) focal length of the microlens arrangement to the respective number N of laser sources present, it is possible to obtain a modular setup of the laser system.

Optionally, the or a control device can be embodied to drive the at least one laser source to set a number N of emitted coherent laser beams. In this case, individual laser sources can be selectively activated or deactivated, for example in order to set the intensity of the combined laser beam. To change the number N of the emitted coherent laser beams, the respective outermost laser sources of the laser system in relation to a center axis of the microlens arrangement are typically activated or deactivated. The number of microlenses of the microlens arrays of the microlens arrangement is independent of the number N of coherent laser beams which are used for the combination.

In a further embodiment, a distance between the focusing device of the input coupling optical unit and the microlens arrangement is adjustable and the control device is embodied to set the distance on the basis of the number N of the emitted coherent laser beams. In this case, a number N of coherent laser beams aligned in parallel can be aligned with the focusing device, for example with a focusing lens, without a further optical unit being required for the phase correction. If the focusing device has a focal length $f_2$, the microlens arrangement, more precisely the first microlens array of the microlens arrangement, is ideally arranged at a distance L2 from the focusing device, which distance is given by: $L2=f_2-p^2/(\lambda_L N)$ or $L2=f_2-f_E$. To set the distance L2, the control device can act on, for example, the adjustment mechanism of the microlens arrangement, which was described further above. By causing the deviation of the distance L2 of the microlens arrangement by $p^2/(\lambda_L N)$ from the focal length $f_2$ of the focusing device, a portion of the phase front common to all of the laser beams or a common phase front curvature of the laser beams incident on the microlens arrangement is set in such a way that the coherent laser beams form a combined, individual laser beam upon the passage through the microlens arrangement or through the imaging homogenizer. The condition placed on the distance L2 is also considered satisfied if the right-hand side deviates by less than 5%, preferably by less than 2%, from the left-hand side.

In a further embodiment, the focusing device is arranged at a distance of its focal length $f_2$ from the microlens arrangement and the focal length $f_2$ of the focusing device, a focal length $f_1$ of the further imaging optical unit and a focal length $f_E$ of the microlens arrangement satisfy the following condition: $f_1 = -f_2^2/f_E$. As described further above, the further imaging optical unit, which can comprise one or more optical elements, serves to correct a phase front curvature common to all laser beams. Under the assumption that the further imaging optical unit is arranged at a distance of its focal length $f_2$ in front of the focusing device, it is required to this end for the focal lengths to satisfy the aforementioned condition. The condition placed on the focal lengths is also considered satisfied if the right-hand side deviates by less than 5%, preferably by less than 2%, from the left-hand side of the aforementioned condition.

In one development, the focal length of the further imaging optical unit is adjustable and the control device is embodied to set the (effective) focal length of the further imaging optical unit on the basis of the number N of the emitted coherent laser beams. Since the effective focal length of the microlens arrangement changes when changing the number N of the emitted coherent laser beams, it is typically necessary for the focal length of the further imaging optical unit also to be adapted in order to satisfy the aforementioned condition for the focal lengths, provided the distance between the focusing device and the microlens arrangement is not set. By way of example, this adaptation is possible if the further imaging optical unit comprises two (thin) lenses, the distance ds of which is altered, wherein the effective focal length $f_1$ or $f_E$ is altered according to the basic equation (2) above, where in this case $f_{1a}$, $f_{2a}$ denote the focal lengths of the thin lenses of the further imaging optical unit.

In a further embodiment, the phase setting devices are embodied to set a (relative) phase $\delta\varphi_n$ for the n-th coherent laser beam (n=1, N), said phase given by:

$$\delta\varphi_n = -(2\pi/\lambda_L)f_E(m_n\lambda_L/p)^2 \quad (3)$$

where p denotes a grid spacing of the microlenses of a respective microlens array, $f_E$ denotes the focal length of the microlens arrangement and $\lambda_L$ denotes the laser wavelength. The following applies to the running index m n:

$$m_n = -\frac{(N+1)}{2} + n.$$

The relative phase $\delta\varphi_n$ differs for each individual coherent laser beam and is therefore, as a rule, set with the aid of the phase setting devices and not with the aid of one or more optical elements of the input coupling optical unit, even though the latter would also be possible in principle. Individual setting of the (relative) phase of the coherent laser beams before the incidence on the microlens arrangement is required in order to generate a suitable phase front for the coherent combination of the laser beams. The phase setting devices can be controlled with the aid of a closed-loop control device in order to adapt the individual (relative) phases on the basis of the properties of the combined laser beam.

In a further embodiment, adjacent emitter surfaces are arranged equidistantly and preferably have a distance $\delta x$ from one another, which is given by $\delta x = \lambda_L f_2/p$, where $\lambda_L$ denotes the laser wavelength, $f_2$ denotes the focal length of the focusing device and p denotes a grid spacing of the microlenses of a respective microlens array. The coherent laser beams typically emerge from emitter surfaces that have an identical distance from one another. In the case where the laser beams extend in parallel, the emitter surfaces are typically arranged along a common direction or line (e.g., in the X-direction), which extends perpendicular to the common beam propagation direction of the laser beams. In this case, the spacing $\delta x$ of the laser beams or the emitter surfaces is typically set by the aforementioned condition.

In a further embodiment, adjacent emission surfaces are arranged equidistantly on a circular arc and are preferably aligned to couple into the microlens arrangement adjacent coherent laser beams with a specified angle difference $\delta\theta$, for which the following applies:

$$\delta\theta = \lambda_L/p,$$

where $\lambda_L$ denotes the laser wavelength and p denotes a grid spacing of the microlenses of a respective microlens array. As described further above, the arrangement of the emission surfaces on a common circular arc and with an angle difference $\delta\theta$ that meets the aforementioned condition was found to be advantageous.

In one embodiment, the input coupling optical unit comprises a beam shaping optical unit for shaping a respective coherent laser beam with a specified, in particular adjustable, divergence angle upon input coupling into the microlens arrangement. In the examples described further above, the coherent laser beams are typically coupled into the microlens arrangement in collimated fashion. By way of example, the beam shaping optical unit can comprise two or more lenses arranged in succession, which expand all coherent laser beams, or provision can be made for a plurality of lenses or other optical elements, for example a number of single lenses that correspond to the plurality of coherent laser beams or a (further) microlens array, in order to generate the divergence angle (which, as a rule, is the same for all coherent laser beams). In the case where the emission surfaces are arranged on a circular arc, this can reduce the distance D between the circular arc and the microlens arrangement and thus achieve a compact structure. By way of example, $D=f-f_E$ applies to the distance in the case where the beam shaping optical unit is formed by a lens with a focal length f and the (effective) focal length of the microlens arrangement is denoted by $f_E$. Here, the distance D can be smaller than the distance $L2 = f_2 - f_E$ between the focusing device and the first microlens array, described above, since the focal length f of the beam shaping optical unit can be chosen to be smaller than the focal length $f_2$ of the focusing device.

In one development, the laser system comprises an even number N of emitter surfaces, and the beam shaping optical unit has a focal length f which satisfies the following condition:

$$f = p^2/\lambda_L,$$

where $\lambda_L$ denotes the laser wavelength and p denotes a grid spacing of the microlenses of a respective microlens array. This condition applies generally to the combination of an even number N of coherent laser beams, i.e., it is independent of the number N of coherent laser beams. This condition placed on the focal length of the beam shaping optical unit moreover defines the most compact structure of the apparatus; i.e., the focal length f should not be undershot—independently of the number N of the coherent laser beams—i.e., $f \geq p^2/\lambda_L$ should apply.

A one-dimensional arrangement of the emitter surfaces, which might be arranged along a common line or on a common circular arc, for example, was assumed in the considerations above. In this case, the emitter surfaces are located in a common plane with the microlenses of the microlens arrays, within which the beam propagation directions of the laser beams also extend. In this case, the microlenses are typically cylindrical lenses.

As an alternative to a one-dimensional coherent combination of laser beams, it is also possible to combine a plurality of N×M laser beams in two-dimensional fashion to form a common laser beam. In this case, the emitter surfaces are typically arranged in a two-dimensional lattice or in a grid, wherein the distances between adjacent emitter surfaces can be chosen to be the same or different in both directions. In this case, the lattice with the emission surfaces can extend in a plane (e.g., XY-plane) or on a curved surface, e.g., on a spherical shell. The laser beams emerging from the emitter surfaces are typically aligned in parallel in the first case and can be aligned, for example, in the direction of the center of the spherical shell, on which the microlens arrangement is arranged, in the second case.

The periodicity of the lattice with the emitter surfaces in this case specifies the grid spacings of the microlenses in two different, e.g., perpendicular, directions (X, Y). In this case, use can be made of 2-dimensional microlens arrays, the grid spacings $p_X$, $p_Y$ of which possibly differ in the two mutually perpendicular directions X, Y, depending on the periodicity of the lattice. Accordingly, the microlenses of the 2-dimensional microlens array have an optionally different curvature in the X-direction and Y-direction, i.e., these are not cylindrical lenses. It is also possible to replace a respective 2-dimensional microlens array by two 1-dimensional microlens arrays with cylindrical lenses, with the cylindrical lenses in the 1-dimensional microlens arrays being aligned perpendicular to one another.

The relationship between the 2-dimensional lattice with the emitter surfaces and the 2-dimensional microlens arrays is analogous to the relationship between the Bravais lattice and the reciprocal lattice. Accordingly, the arrangement of the emitter surfaces can also correspond to closest packing, i.e., a hexagonal lattice. In this case, the microlenses of the microlens arrays are likewise arranged in a hexagonal arrangement. As a matter of principle, the combination of the coherent laser beams in the two linearly independent, not necessarily perpendicular lattice directions is independent; i.e., the conditions or equations specified further above apply to both lattice directions independently of one another.

The contributions in the two mutually perpendicular directions only add up when setting the relative phase of the laser beams; i.e., for a number of N×M laser beams, which are arranged in a rectangular lattice (in the X-direction and Y-direction), the following applies to the respective phase $\delta\varphi_{n,m}$:

$$\delta\varphi_{n,m} = -(2\pi/\lambda_L)f_{E,X}(pn\lambda_L/p_X)^2 - (2\pi/\lambda_L)f_{E,Y}(qm\lambda_L/p_Y)^2,$$

where $p_X$ denotes the grid spacing of the microlenses in the X-direction and $p_Y$ denotes the grid spacing of the microlenses in the Y-direction and where $f_{E,X}$ denotes the effective focal length of the microlens arrangement in the X-direction and $f_{E,Y}$ denotes the effective focal length of the microlens arrangement in the Y-direction. Here, the following respectively applies:

$$p_n = -\frac{(N+1)}{2} + n$$

with n=1, ..., N and $$q_m = -\frac{(N+1)}{2} + m$$

with m=1, ..., N.

In a further embodiment, the laser system comprises an even number N of emitter surfaces and the microlens arrangement comprises a phase shifting device, which is embodied to generate a constant phase offset of π between bundles of rays of the coherent laser beams, which pass through adjacent microlenses of a respective microlens array. As a rule, a diffraction pattern has a 0th order of diffraction and, symmetrically thereto, an even number of higher orders, i.e., an odd overall number of orders of diffraction. To superpose an even number N of coherent laser beams along one direction (e.g., the X-direction), it is therefore typically necessary to eliminate the 0th order of diffraction. A phase shifting device which suppresses the 0th order of diffraction by destructive interference can be used to this end.

The phase shifting device can be embodied, for example, as a phase shifter element, in which first passing elements and second passing elements are formed alternately in a direction transversely to the beam propagation direction, wherein passing a first passing element in relation to passing a second passing element generates the phase offset of π. Depending on the (even or odd) number of coherent laser beams, such a phase shifter element can be selectively introduced into or removed from the beam path, for the purposes of which, for example, use can be made of the above-described adjustment mechanism.

Alternatively, the phase shifting device can be integrated in one of the microlens arrays. In this case, the profiling of the microlens array respectively provides a jump in thickness at the transition of two adjacent microlenses, said jump in thickness generating the phase offset of π. A separate phase shifter element can be omitted in this construction. By way of example, the thickness of the microlens array changes gradually over the width of a microlens aperture or a grid spacing, and so a phase offset of π is built up over the width of the microlens aperture; this change in thickness is superposed by the actual lens profile. It is likewise possible to form every second microlens with a uniform additional thickness which generates the phase jump in a manner analogous to the phase shifter element described further above.

As a matter of principle, the laser system described further above also facilitates the coherent combination of ultrashort pulse laser beams without additional modifications being required. Should a comparatively large number of coherent laser beams be combined along one spatial direction (for example, of the order of ten or more laser beams), it is advantageous to undertake a wavelength-dependent correction.

In a further embodiment, the laser system comprises a first wavelength-dispersive element arranged in front of the microlens arrangement, in particular a first diffraction grating, for spectrally splitting the coherent laser beams into a plurality of bundles of rays, which pass through the microlens arrangement in spatially separate fashion, and a second wavelength-dispersive optical element arranged after the microlens arrangement, in particular a second diffraction grating, for spectrally combining the bundles of rays for forming the combined laser beam with one wavelength.

In this embodiment, the laser beams, which have a uniform wavelength $\lambda_L$ or a uniform wavelength spectrum at emission, are spectrally divided into a plurality of bundles of rays by means of a first wavelength-dispersive optical element, said bundles of rays typically corresponding to different orders of diffraction of the wavelength-dispersive optical element (and consequently to different wavelengths). The respective bundles of rays pass through the microlens arrangement in spatially separated fashion and substantially parallel to one another. The input coupling optical unit can comprise an optical element, for example in the form of a collimation lens, in order to collimate or align in parallel the bundles of rays emerging from the first wavelength-selective element. Using a further optical unit, for example a focusing lens, the bundles of rays are radiated or focused on the second wavelength-dispersive optical element after passing through the microlens arrangement, said second wavelength-dispersive optical element causing the spectral combination of the bundles of rays to form the common laser beam. The equations or relationships specified further above, which contain the wavelength $\lambda_L$, apply accordingly to the central wavelength of the spectral distribution of the bundles of rays, which need not necessarily correspond to the wavelength of the laser beams emitted at the emitter surfaces.

In one development, the input coupling optical unit comprises a collimation lens, which is embodied as an aspherical lens. Here, the curvature of the aspherical lens surface is chosen in such a way that there is a wavelength-dependent correction of the phase front of the laser beams, more precisely of the respective bundles of rays. As described further above, such a wavelength-dependent correction is only required, as a rule, if a comparatively large number of USP laser beams are intended to be coherently superposed.

A further aspect of the disclosure relates to a method for combining a number N, in particular an adjustable number, of coherent laser beams to form at least one combined laser beam, in particular by means of an apparatus as described further above, comprising: coupling the coherent laser beams into a microlens arrangement comprising at least two microlens arrays and combining the coherent laser beams to form the at least one combined laser beam in the microlens arrangement. As described further above, it is typically necessary, for this purpose, for adjacent coherent laser beams to be coupled into the microlens arrangement with a specified angle difference $\delta\theta$, to which the following applies: $\delta\theta=\lambda_L/p$, where $\lambda_L$ denotes the laser wavelength and p denotes a grid spacing of the microlenses of a respective microlens array. Consequently, the angle difference is independent of the number N of laser beams which are coupled into the microlens arrangement; i.e., it is not necessary to vary the latter when the number N of laser beams is changed.

In one variant of the method, a focal length $f_E$ of the microlens arrangement which satisfies the following condition is set: $f_E=p^2/(\lambda L_N)$, where p denotes a grid spacing of the microlenses of a respective microlens array and $\lambda_L$ denotes the laser wavelength. When the number N of combined laser beams is altered, it is necessary to alter the (effective) focal length of the microlens arrangement. To this end, use can be made of the above-described adjustment mechanism, for example. Observing this condition is necessary if the coherent laser beams each have the same intensity.

In a further variant, the method comprises: setting a phase $\delta\varphi_n$ of the n-th coherent laser beam (n=1, ..., N) which is given by: $\delta\varphi_n=-(2\pi/\lambda_L)f_E(m_n\lambda_L/p)^2$, where p denotes a grid spacing of the microlenses of a respective microlens array, $f_E$ denotes the focal length of the microlens arrangement and $\lambda_L$ denotes the laser wavelength, and wherein the following applies:

$$m_n = -\frac{(N+1)}{2} + n.$$

As described further above, the coherent combination of the laser beam requires setting of the relative phase differences between the laser beams. By way of example, this setting can be implemented with the aid of the phase setting devices described further above.

In a further variant, the input coupling of the coherent laser beams is implemented by means of an input coupling optical unit comprising a focusing device, wherein the method further comprises: setting a distance between the focusing device and the microlens arrangement which is given by: $L2=f_2-p^2/(N\lambda_L)$, where $f_2$ denotes a focal length of the focusing device, p denotes a grid spacing of the microlenses of a respective microlens array and $\lambda_L$ denotes the laser wavelength. As described further above, a correction of the (global) phase front curvature is typically also required in addition to setting the absolute phase differences, said phase front curvature depending on the number N of coherent laser beams. Typically, no additional imaging optical unit is required for correcting the phase front curvature in this example.

In an alternative variant, the input coupling is implemented by means of an input coupling optical unit comprising a focusing device and a further imaging optical unit, wherein the method further comprises: setting a focal length $f_1$ of the further imaging optical unit which is given by: $f_1=-f_2^2/f_E$, where $f_2$ denotes a focal length of the focusing device and $f_E$ denotes a focal length of the microlens arrangement. By way of example, the focal length of the further imaging optical unit can be set by virtue of altering the distance between two or more optical elements of the imaging optical unit. The (global) phase curvature of the laser beams can be corrected by the further imaging optical unit.

In the following description of the drawings, identical reference signs are used for the same components or for components having the same function.

FIG. 1 shows an exemplary structure of a laser system 1, which comprises a laser source 2 for generating a number N of coherent laser beams 3.1, ..., 3.N. To this end, the laser source 2 comprises a mode-coupled fiber master oscillator 4, which generates seed laser radiation at a laser wavelength $\lambda_L$ which is split in a conventional 1-to-N coupling device 5, for example in the form of a microlens array, into the number N of coherent laser beams 3.1, ..., 3.N. The laser beams 3.1, ..., 3.N run through a corresponding number N of phase setting devices 6.1, ..., 6.N, which facilitate setting of a respective individual phase $\delta\varphi_n$ of the laser beams 3.1, ..., 3.5 (n=1, ..., N) by virtue of bringing about a suitable phase retardation. By way of example, the phase setting devices 6.1, ..., 6.N can be embodied as electro-optic modulators, acousto-optic modulators, etc.

After the phase setting devices 6.1, ..., 6.N, the coherent laser beams 3.1, ..., 3.N run through a corresponding number N of amplifier fibers 7.1, ..., 7.N in order to amplify the coherent laser beams 3.1, ..., 3.N. The end sides of the amplifier fibers 7.1, ..., 7.N serve as emission surfaces 8.1, ..., 8.N, at which the coherent laser beams 3.1, ..., 3.N are emitted. The phase setting devices 6.1, ..., 6.N can also be arranged downstream of the amplifier fibers 7.1, . . . , 7.N or act directly on the amplifier fibers 7.1, . . . , 7.N, for example by virtue of generating an adjustable mechanical tension on the amplifier fibers 7.1, . . . , 7.N.

The coherent laser beams 3.1, . . . , 3.N are deflected at a deflection device 9 comprising a plurality of deflection mirrors in order to increase the fill factor, i.e., in order to reduce the distance between adjacent laser beams 3.1, . . . , 3.N. It is understood that the deflection device 9 is not mandatory. In the example shown, the coherent laser beams 3.1, . . . , 3.N enter with a parallel alignment with respect to one another into a beam combination device 10, which comprises a microlens arrangement 11 or an imaging homogenizer for the coherent combination of the laser beams 3.1, . . . , 3.N for the formation of a combined laser beam 12.

As can be identified in FIG. 1, a portion 12a of the combined laser beam 12 is output coupled by way of an output coupling device in the form of a partly transmissive mirror 13 and is incident on a detector 14. The detector 14 is signal-connected to a closed-loop control device 15a of the laser system 1, which drives the phase setting devices 6.1, . . . , 6.N in order to adapt the individual phases $\delta\varphi_n$ of the laser beams 3.1, . . . , 3.N on the basis of the properties of the detected portion 12a of the combined laser beam 12. In particular, the closed-loop control device 15a can facilitate a control of the phase setting devices 6.1, . . . , 6.N for generating desired (intended) phases $\delta\varphi_n$ of the laser beams 3.1, . . . , 3.N. Even though the number N of phase setting devices 6.1, . . . , 6.N corresponds to the plurality N of laser beams 3.1, . . . , 3.N in the example shown, a number of N−1 phase setting devices 6.1, . . . , 6.N−1 are sufficient, as a rule. In the laser system 1 shown in FIG. 1 it is possible, firstly, to obtain a high beam quality of, e.g., M=1.3 of the combined laser beam 12; secondly, errors on account of nonlinear effects during the individual amplification of the laser beams 3.1, . . . , 3.N in the amplifier fibers 7.1, . . . , 7.N average out, and so it is possible to obtain a significant increase in the power of the laser beams 3.1, . . . , 3.N.

Figure 2:
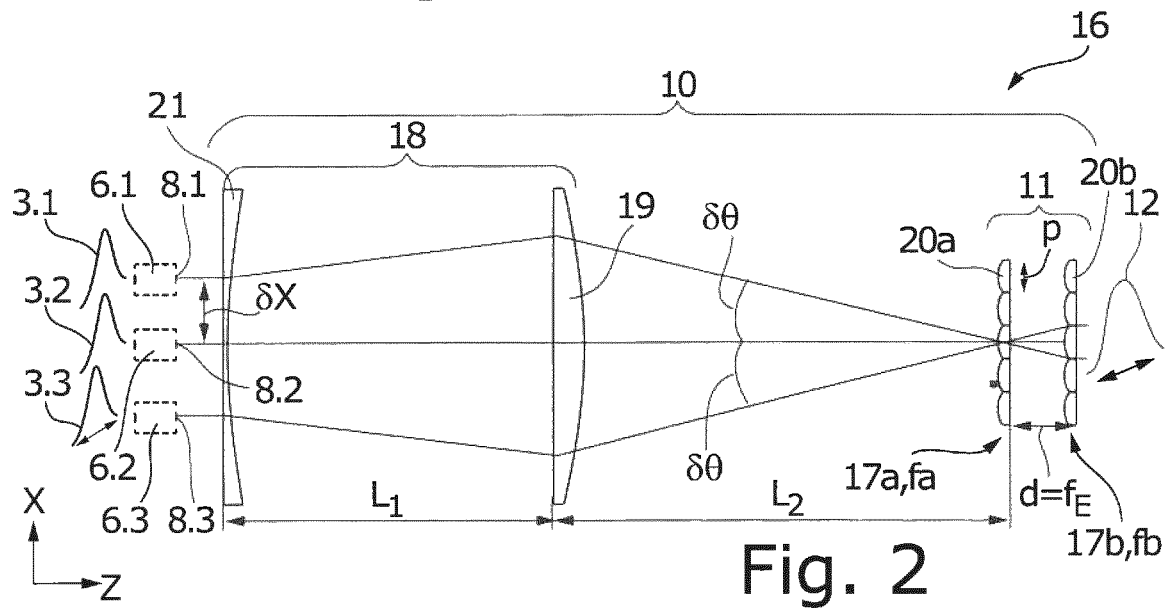
FIG. 2 shows an illustration of the apparatus of FIG. 1 with a beam combination device which comprises an input coupling optical unit and a microlens arrangement with two microlens arrays, FIG. 3a,b show an illustration of a microlens arrangement with three microlens arrays and with an adjustment mechanism and an illustration of the beam path through a sub-aperture of the microlens arrangement.

FIG. 2 shows an apparatus 16 analogous to FIG. 1 for combining an (exemplary) number of N=3 coherent laser beams 3.1, 3.2, 3.3 using a beam combination device 10 which comprises a microlens arrangement 11 with two microlens arrays 17a,b and also an input coupling optical unit 18. The apparatus 16 also comprises three phase setting devices 6.1, 6.2, 6.3 for setting the phases $\delta\varphi_1$, $\delta\varphi_2$, $\delta\varphi_3$ of the three laser beams 3.1, 3.2, 3.3 in such a way that, in combination with the input coupling optical unit 18, a phase front forms at the microlens arrangement 11, which phase front facilitates the coherent combination of the laser beams 3.1, 3.2, 3.3 to form the combined laser beam 12 whilst maintaining the beam quality. In this case, the emitter surfaces 8.1, 8.2, 8.3 are arranged along a line in the X-direction and the laser beams 3.1, 3.2, 3.3 enter with parallel alignment along a uniform propagation direction (Z-direction) into the input coupling optical unit 18.

In this case, the emitter surfaces 8.1, 8.2, 8.3 or the coherent laser beams 3.1, 3.2, 3.3 are arranged equidistantly, i.e., at the same distances $\delta x$, along the X-direction. The input coupling optical unit 18 is embodied to couple into the microlens arrangement 11 adjacent coherent laser beams 3.1, 3.2, 3.3 with a specified angle difference $\delta\theta$, for which the following applies: $\delta\theta=\lambda_L/p$, where $\lambda_L$ denotes the (uniform) wavelength of the laser beams 3.1, 3.2, 3.3 and p denotes a grid spacing (pitch) of the microlenses 20a,b of a respective microlens array 17a,b.

To generate the angle difference $\delta\theta$, the input coupling optical unit 18 comprises a focusing device in the form of a focusing lens 19, more precisely a cylindrical lens, which focuses the laser beams 3.1, 3.2, 3.3 on the microlens arrangement 11, more precisely on the first microlens array 17a of the microlens arrangement 11. To satisfy the condition imposed on the angle difference $\delta\theta$, the emitter surfaces 8.1, 8.2, 8.3 in the example shown in FIG. 2 are arranged at a distance $\delta x$ from one another, given by $\delta x=\lambda_L f_2/p$, where $f_2$ denotes the focal length of the focusing lens 19, which is arranged in FIG. 2 at a distance L2 from the microlens arrangement 11 which corresponds to the focal length $f_2$ thereof, i.e., the following applies: L2=$f_2$.

Under the assumption that the intensities of the laser beams 3.1, 3.2, 3.3 emerging from the emission surfaces 8.1, 8.2, 8.3 have the same magnitude, the coherently superposed laser beam 12, shown in FIG. 2, can be generated by means of the microlens arrangement 11 if the microlens arrangement 11 and the combined laser beams 3.1, 3.2, 3.3 satisfy the following equation (1):

$$N=p^2/(\lambda_L f_E) \qquad (1)$$

where N denotes the number of coherent laser beams (in this case: N=3) and $f_E$ denotes the focal length of the microlens arrangement 11. Equation (1) should be adhered to as exactly as possible since deviations lead to a deterioration in the beam quality of the combined laser beam 12.

In the example shown, the microlenses 20a of the first microlens array 17a have a first focal length $f_a$ and the microlenses 20b of the second microlens array 17b have a second focal length $f_b$, where $f_a=f_b$ applies. In the example shown, the two microlens arrays 17a,b are arranged at a distance d from one another, which corresponds to the focal length $f_a$ or $f_b$ and the resultant focal length $f_E$ of the microlens arrangement 11.

In the example shown, the laser beams 3.1, 3.2, 3.3 that emerge from the emission surfaces 8.1, 8.2, 8.3 are single mode beams, i.e., these each have a Gaussian profile with a full width at half maximum of $w_{R,0}$. Alternatively, the laser beams 3.1, 3.2, 3.3 might have a different beam profile with a possibly reduced degree of spatial coherence, for example a donut-shaped beam profile or a top hat beam profile. To form a combined laser beam 12 with a corresponding Gaussian profile with a larger full width at half maximum $w_R>w_{R,0}$ from the laser beams 3.1, 3.2, 3.3 in the microlens arrangement 11, it is necessary for the laser beams 3.1, 3.2, 3.3 to be radiated onto the microlens arrangement 11 with a phase front or with individual (angle of incidence $\theta$-dependent) phases $\delta\varphi_n(\theta)$, to which the following applies:

$$\delta\varphi_n(\theta)=(2\pi/\lambda_L)f_E\theta^2-(2\pi/\lambda_L)f_E(\lambda_L/p)m_n\theta,$$

wherein the following applies in the present example: $m_n=-1, 0, +1$.

To a good approximation, the following applies to the phase front or the individual phases $\delta\varphi_n(x)$ in the spatial domain:

$$\delta\varphi_n(x)=(2\pi/\lambda_L)1(2f_1)x^2-(2\pi/\lambda_L)f_E(mn\lambda_L/p)^2, \qquad (4)$$

where x=0 denotes the central axis of the beam combination device 10, along which the central laser beam 3.2 propagates, and $f_1$ denotes the focal length of a further imaging optical unit 21 in the form of a cylindrical lens, which is used to correct the phase curvature and which can be embodied as a cylindrical lens in the simplest case (in the case of a one-dimensional combination). The further imaging optical unit 21 is arranged at a distance L1 upstream of the focusing lens 19, which corresponds to the focal length $f_2$ of the focusing lens 19.

The first summand of equation (4) above for the spatially dependent phases $\delta\varphi_n(x)$ corresponds to an imaging optical unit in the form of a (cylindrical) lens 21 if the focal length $f_1$ thereof satisfies the following condition in the apparatus 16 shown in FIG. 2: $f_1 = -f_2^2/f_E$. Consequently, the further imaging optical unit 21 serves to adapt the curvature of the phase front $\varphi_n(x)$ of the laser beams 3.1, 3.2, 3.3 incident on the microlens arrangement 11 in order to satisfy the equation (4) above in respect of the first summand.

To set the (individual) phases $\delta\varphi_n$ of the laser beams 3.1, 3.2, 3.3, which correspond to the second summand in the equation above, the phase setting devices 8.1, 8.2, 8.3 are driven with the aid of the closed-loop control device 15a in such a way that these generate the following phase $\delta\varphi_n$ for the n-th coherent laser beam 3.1, ..., 3.N:

$$\delta\varphi_n = -(2\pi/\lambda_L)f_E(m_n\lambda_L/p)^2.$$

In the present example, i.e., in the case of a number of N=3 laser beams 3.1, 3.2, 3.3, the following arises for the three (relative) phases $\delta\varphi_1$, $\delta\varphi_2$, $\delta\varphi_3$ to be set:

$$\delta\varphi_1 = +(2\pi/\lambda_L)f_E(\lambda_L/p)^2$$

$$\delta\varphi_2 = 0$$

$$\delta\varphi_3 = -(2\pi/\lambda L)f_E(\lambda_L/p)^2$$

The number N of coherent laser beams 3.1, ..., 3.N can be altered by virtue of the laser source 2 or the laser system 1 overall being modified, for example by virtue of emitter surfaces 8.1, ..., 8.N, phase setting devices 6.1, ..., 6.N, etc. being added or removed. The number N of coherent laser beams 3.1, ..., 3.N used for the combination can also be altered by virtue of the closed-loop control device 15a driving the laser source 2 in order to alter the intensity of certain laser beams 3.1, ..., 3.N, for example in order to selectively activate or deactivate certain laser beams 3.1, ..., 3.N.

If the number N of coherent laser beams 3.1, ..., 3.N is changed, it is necessary to suitably adapt the beam combination device 11 in order to satisfy the conditions described further above, in particular equation (1). To this end, the microlens arrangement 11 can be embodied to set its (effective) focal length $f_E$ and it comprises at least three microlens arrays 17a-c with focal lengths $f_a$, $f_b$, $f_c$, as illustrated in exemplary fashion for the microlens arrangement 11 of FIG. 3a.

Figures 3A, 3B:
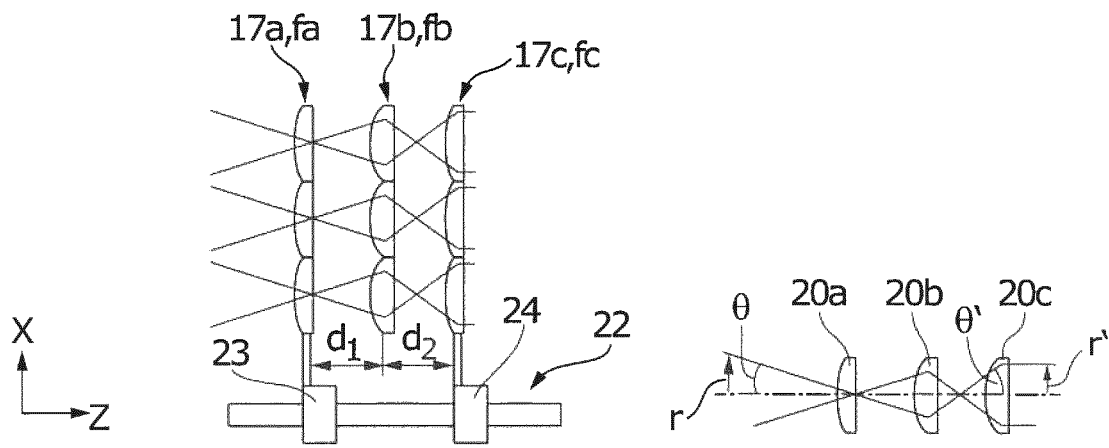

The effective focal length $f_E$ relates to a bundle of rays which in each case passes through one microlens 20a-c per microlens array 17a-c (corresponding to a sub-aperture); cf. FIG. 3b. A microlens arrangement 11 which is used in the beam combination device 10 typically has the properties set forth below in relation to a bundle of rays for respectively one microlens 20a-c per microlens array 17a-c when written in matrix optics, i.e., in the case of the imaging matrix $$\begin{pmatrix} A & B \\ C & D \end{pmatrix},$$

for the input vector $(r,\theta)$ and the output vector $(r',\theta')$: A=0; |B|=$f_E$. Furthermore, D<1 usually also applies (for a substantially collimated beam); C then arises on the basis of A, B and D. The use of at least three microlens arrays 17a-c is necessary for satisfying the second condition |B|=$f_E$ for variable $f_E$.

A motor-driven adjustment mechanism 22 (for example with a driven gear wheel engaging in a rack) allows a motor-driven adjustment of the positions of carriages 23, 24, which carry the first and third microlens array 17a, 17c of the microlens arrangement 11, with the aid of an electronic (programmable) control device 15, and hence setting of a distance d1 between the first and second microlens array 17a, 17b and a distance d2 between the second and third microlens array 17b, 17c independently of one another. In the example shown, the second microlens array 17b has a fixed embodiment.

For a desired effective focal length $f_E$ corresponding to equation (1), it is possible to determine the distances $d_1$, $d_2$ to be set at the given focal lengths $f_a$, $f_b$, $f_c$ as set forth below and to move the carriages 23, 24 along guides to corresponding adjustment positions:

$$d_2 = f_b\left(1 + \frac{f_E}{f_a}\right)$$

and $$d_1 = f_b + f_a + \frac{f_b f_a}{f_E}$$

Figure 4:
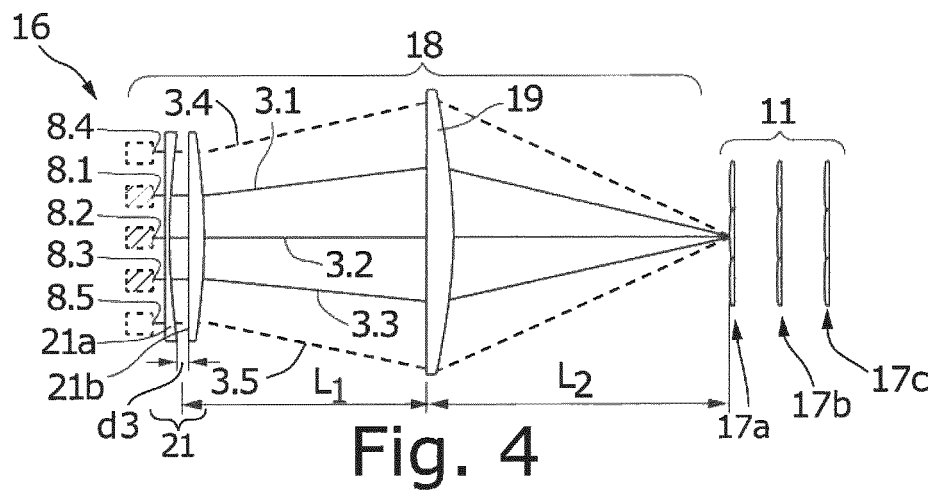
FIG. 4 shows an illustration of an apparatus analogous to FIG. 2 with an input coupling optical unit, which comprises an imaging optical unit with an adjustable focal length for correcting a phase front curvature.

If the effective focal length $f_E$ of the microlens arrangement 11 is altered, it is typically also necessary to adapt the input coupling optical unit 18 accordingly. In the apparatus 16 shown in FIG. 2, this can be achieved by virtue of making the focal length $f_1$ of the further imaging optical unit 21 adjustable in order to satisfy the condition $f_1 = -f_2^2/f_E$. For this purpose, the further imaging optical unit 21 can be formed by two (thin) lenses 21a, 21b, the spacing d3 of which is adjustable, as illustrated in FIG. 4. By choosing the distance d3 between the lenses 21a, 21b, there is a change in the (effective) focal length $f_1$ of the further imaging optical unit 21 such that the aforementioned condition can be satisfied, for example if the number N of laser beams 3.1, ..., 3.N is increased from N=3 to N=5, as indicated in FIG. 4, in the case of which two additional, outer laser beams 3.4, 3.5 and emitter surfaces 8.4, 8.5 were added.

Figure 5:
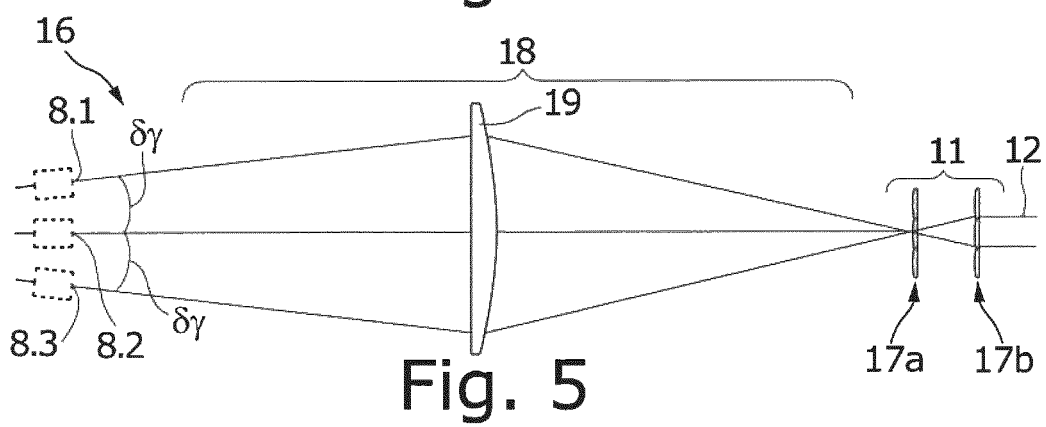
FIG. 5 shows an illustration analogous to FIG. 4, in which emission surfaces for emitting the coherent laser beams are respectively arranged at an angle to one another for correcting the phase front curvature.

FIG. 5 shows an apparatus 16, in which the input coupling optical unit 18 comprises no additional imaging optical unit 21 for correcting the phase front $\delta\varphi_n(x)$. To adapt the phase front $\delta\varphi_n(x)$, the emitter surfaces 8.1, 8.2, 8.3 are each aligned at an angle $\delta\gamma$ with respect to one another, said angle corresponding to the angle at which the laser beams 3.1, 3.2, 3.3 emerge from the imaging optical unit 21 shown in FIG. 2 or in FIG. 4. Adapting the phase front $\delta\varphi_n(x)$, more precisely adapting the first summand in equation (4) above, can be achieved without the provision of an additional imaging optical unit in this case, i.e., the input coupling optical unit 18 only comprises the focusing lens 19.

Figure 6:
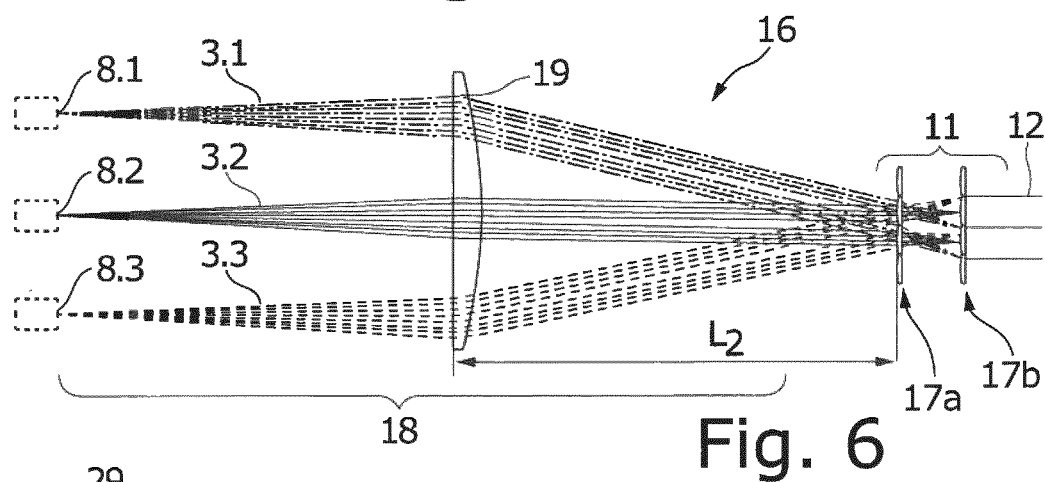
FIG. 6 shows an illustration analogous to FIG. 4, in which the input coupling optical unit is formed by a focusing lens.

It is also possible to dispense with an imaging optical unit 21 for adapting the phase front curvature if the emitter surfaces 8.1, 8.2, 8.3 are arranged along a line in the X-direction and are aligned in parallel, as illustrated in FIG. 6. In this case, the distance L2 between the focusing lens 19 and the microlens arrangement 11, more precisely the first microlens array 17a of the microlens arrangement 11, is suitably chosen, to be precise as follows: $L2 = f_2 - p^2/(N\lambda_L)$. In the apparatus 16 of FIG. 6, the distance L2 consequently also depends on the number N of laser beams 3.1, ..., 3.N, and so the latter must likewise be adapted when the number N of laser beams 3.1, ..., 3.N is altered. To this end, the control device 15 can act on the focusing lens 19 and/or on the adjustment mechanism 22 of the microlens arrangement 11, present in any case here, in order to displace the focusing lens 19 and the microlens arrangement 11 relative to one another.

Figure 7:
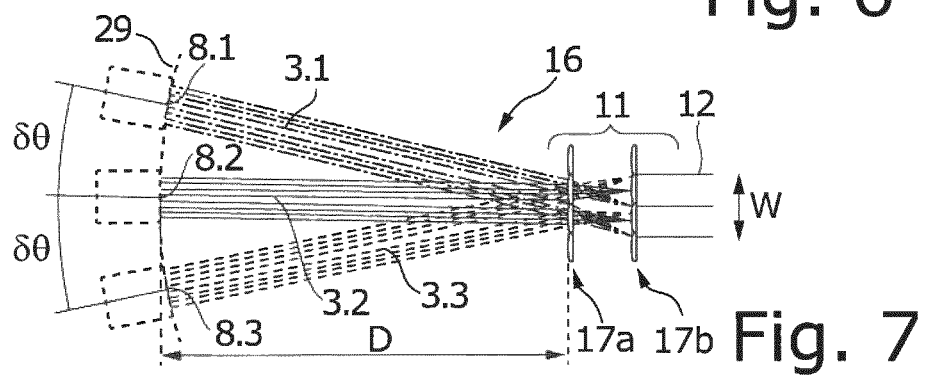
FIG. 7 shows an illustration of a beam combination device, in which the emission surfaces are arranged on a circular arc.

In the case of the apparatus 16 shown in FIG. 7, the beam combination device 10 comprises only the microlens arrangement 11 and no input coupling optical unit. In this example, the emitter surfaces 8.1, 8.2, 8.3 are aligned with respect to one another on a circular arc 29 at a respective difference angle: $\delta\theta = \lambda_L/p$. In this case, the following applies to the fill factor FF of the laser beams 3.1, 3.2, 3.3:

$$FF = 2p/(\pi w),$$

where w denotes the beam diameter of the combined laser beam 12. The following applies to the distance D:

$$D = w^2 \pi / \lambda_L = 4p^2/(\pi FF^2 \lambda_L).$$

A comparatively large distance D of approximately 2.5 m is required in order to achieve a fill factor FF of approximately 35%, for example, in the case of a grid distance p of approximately 500 μm when using the apparatus 16 shown in FIG. 7.

Figure 8A:
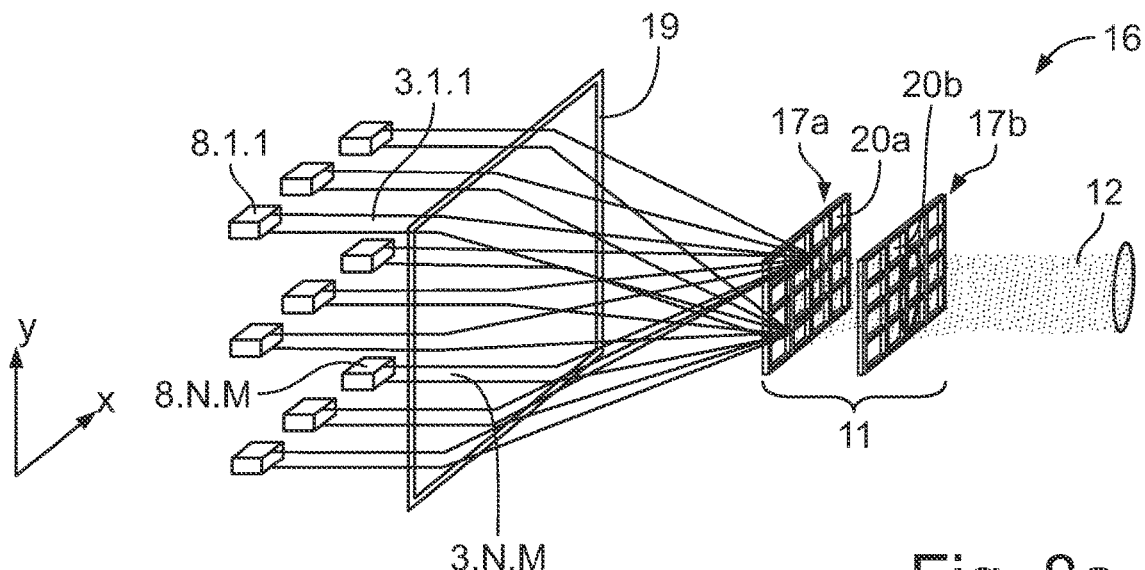
FIG. 8a-c show illustrations of three beam combination devices, in which the emission surfaces are respectively arranged on a lattice.
Figure 8B:
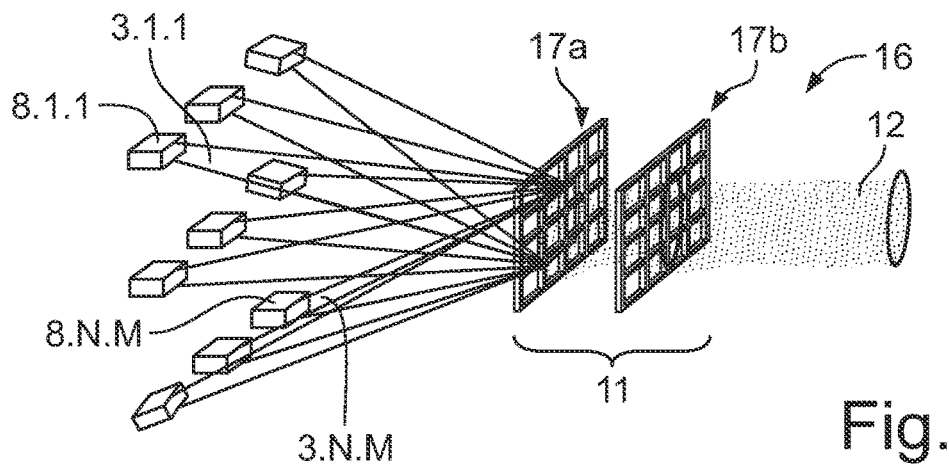
Figure 8C:
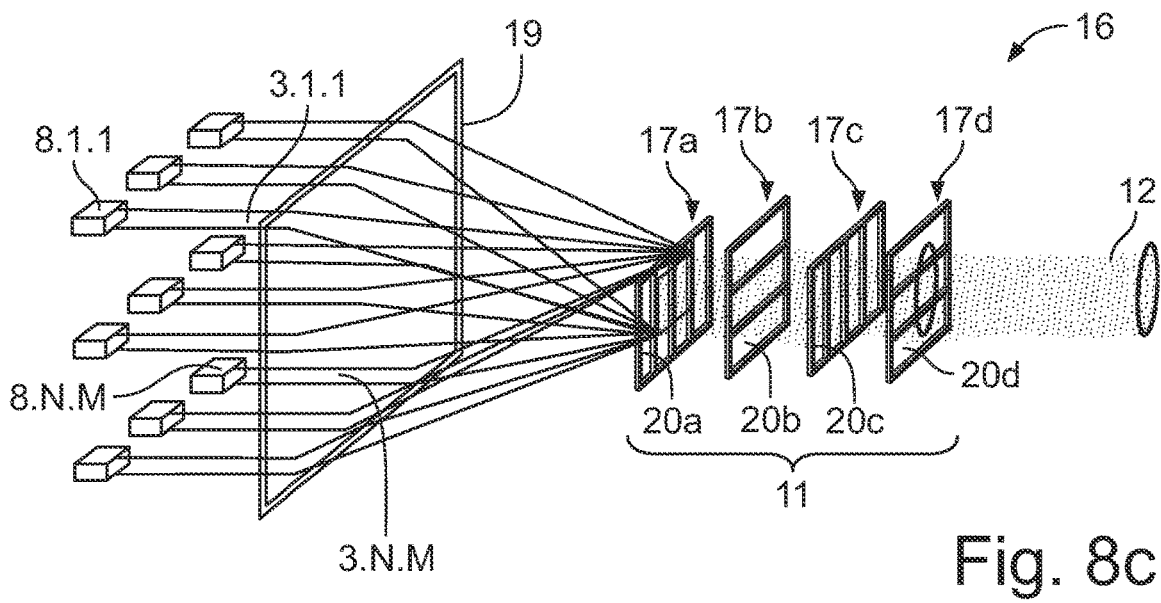

In the apparatuses 16 described in conjunction with FIG. 2 to FIG. 7, the laser beams 3.1, . . . , 3.N were combined in one dimension. FIGS. 8a-c each show an apparatus 16, in which a number N (in this case: N=3) x M (in this case: M=3) of emission surfaces 8.1.1, . . . , 8.N.M are arranged in a two-dimensional lattice. In the example shown in FIG. 8a, the emission surfaces 8.1.1, . . . 8.N.M are arranged in a rectangular lattice in a common plane (XY-plane) and the beam propagation directions of all laser beams 3.1.1, . . . , 3.N.M extend in parallel (in the Z-direction). In a manner analogous to FIG. 6, the input coupling optical unit 18 in the apparatus 16 of FIG. 8a only has a focusing device in the form of a focusing lens 19, which is illustrated as a square in FIG. 8a. The microlenses 20a,b of the microlens arrays 17a,b of the microlens arrangement 11 are each arranged in a corresponding, rectangular lattice and are aligned parallel to the XY-plane.

Depending on the distances between the emitter surfaces 8.1.1, . . . 8.N.M or depending on the periodicity of the lattice in the X-direction or in the Y-direction, the grid spacings $p_X$, $p_Y$ of the microlenses 20a,b can also differ from one another in the two mutually perpendicular directions X, Y. Accordingly, the microlenses 20a,b have an optionally different curvature in the X-direction and Y-direction, i.e., these are not cylindrical lenses. As a matter of principle, the combination of the coherent laser beams 3.1.1, . . . 3.N.M in the two linearly independent directions X, Y, which are perpendicular to one another in the example shown, is independent; i.e., the conditions or equations specified further above apply to both directions X, Y independently of one another.

The contributions in the two mutually perpendicular directions only add up when setting the relative phase of the laser beams 3.1.1, . . . 3.N.M; i.e., for a number of N×M laser beams, which are arranged in a rectangular lattice (in the X-direction and Y-direction), the following applies to the respective phase $\delta\varphi_{n,m}$:

$$\delta\varphi_{n,m} = -(2\pi/\lambda_L) f_{E,X}(p_n \lambda_L/p_X)^2 - (2\pi/\lambda_L) f_{E,Y}(q_m \lambda_L/p_Y)^2$$

where $p_X$ denotes the grid spacing of the microlenses in the X-direction and $p_Y$ denotes the grid spacing of the microlenses in the Y-direction and where $f_{E,X}$ denotes the effective focal length of the microlens arrangement 11 in the X-direction and $f_{E,Y}$ denotes the effective focal length of the microlens arrangement 11 in the Y-direction, wherein the following applies:

$$p_n = -\frac{(N+1)}{2} + n$$

with n=1, . . . , N and $$q_m = -\frac{(N+1)}{2} + m$$

with m=1, . . . , N.

In the apparatus 16 shown in FIG. 8b, the emitter surfaces 8.1.1, . . . , 8.N.M are likewise arranged on a lattice, the latter however extending along a curved surface, more precisely along a spherical shell, wherein the beam propagation directions of the laser beams 3.1.1, . . . , 3.N.M are aligned perpendicular to the spherical shell and the microlens arrangement 11 is arranged in the vicinity of the center of the spherical shell. An arrangement of the emitter surfaces 8.1.1, . . . , 8.N.M on a lattice that extends along a different curved surface, for example along an ellipsoid, is likewise possible. In a manner analogous to the apparatus 16 illustrated in FIG. 7, it is possible to dispense with an input coupling optical unit 18 in this case.

FIG. 8c shows an apparatus 16 analogous to FIG. 8a, in which the two two-dimensional microlens arrays 17a,b of the microlens arrangement 11 have been replaced by four one-dimensional microlens arrays 17a-d. The microlens arrays 17a-d each comprise a plurality of microlenses 20a-d in the form of cylindrical lenses, wherein the microlenses 20a,c of the first and third microlens array 17a,c and the microlenses 20b,d of the second and fourth microlens array 17b,d are aligned perpendicular to one another, to be precise along the X-direction and Y-direction, respectively.

In the examples described further above, an odd number N of coherent laser beams 3.1, . . . , 3.3 were superposed. Should the intention be to superpose an even number N of laser beams 3.1, . . . , 3.N, use can be made of a phase shifting device 25, as described below on the basis of FIGS. 9a-c. Here, the phase shifting device 25 is integrated in a respective first or second microlens array 17a,b of the microlens arrangement 11 and in each case generates a phase offset of π at a transition π between bundles of rays 26 which run through adjacent microlenses 20b of the second microlens array 17b (cf. FIG. 9a) or adjacent microlenses 20a of the first microlens array 17a (cf. FIGS. 9b,c). As a result, the 0-th order of diffraction can be eliminated by destructive interference such that an even number N of coherent laser beams 3.1, . . . , 3.N can be combined to form the combined laser beam 12.

Figures 9A, 9B, 9C:
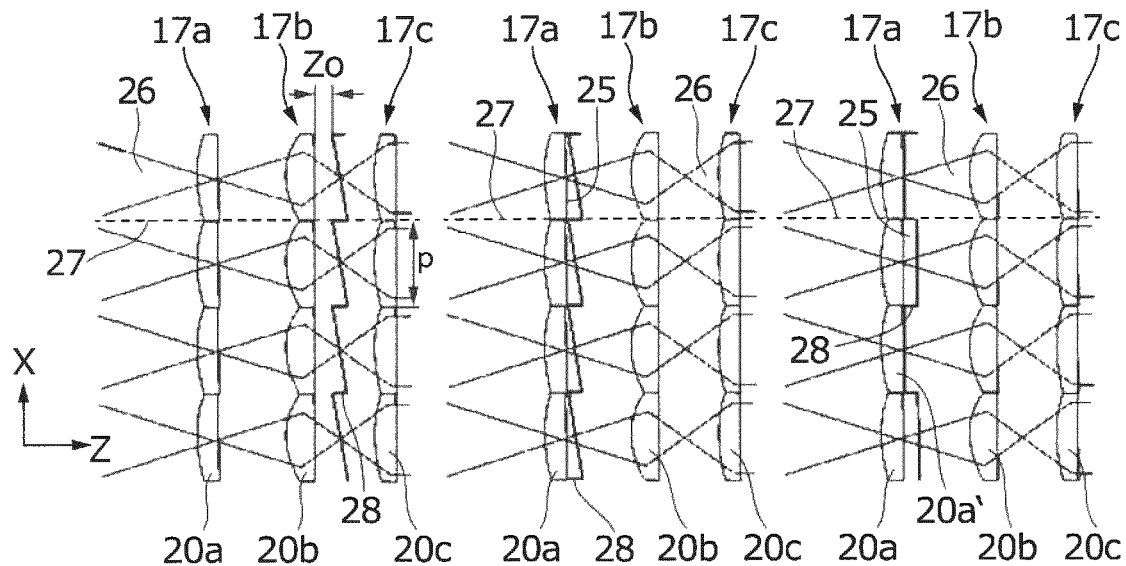
FIG. 9a-c show illustrations of three microlens arrangements, which each comprise a phase shifting device.

In the microlens arrangement 11 shown in FIG. 9a, a jump in thickness 28 is provided at the transition between adjacent microlenses 20b of the second microlens array 17b. In this case, the additional thickness of a respective microlens 20b along the X-direction increases linearly from an initial value z0 of additional thickness to an additional thickness corresponding to z0 plus the thickness corresponding to the phase difference of π over the width or the grid spacing p of the respective microlens 20b. The initial value z0 serves to bring the location of the phase jump in respect of the X-direction approximately to the focal plane behind the third microlens array 17c. The sawtooth profile is provided in all microlenses 20b of the second microlens array 17b.

In the microlens arrangement 11 of FIG. 9b, the phase shifting device 25 is integrated in the first microlens array 17a and there likewise is a jump in thickness 28 at the transition 27 of adjacent microlenses 20a. The additional thickness of a respective microlens 20a along the X-direction increases linearly from an additional thickness of 0 (zero) to an additional thickness corresponding to the phase difference of π over the width of the microlens 20a. This sawtooth profile is provided in all microlenses 20a of the first microlens array 17a.

In the variant shown in FIG. 9c, the first microlens array 17a is likewise provided with an integrated phase shifting device 25. Here, there is a jump in thickness 28 that generates the phase offset of π at the transition π between adjacent microlenses 20a. The additional thickness provided by the integrated phase shifting device 25 is uniformly maintained over the entire width of a respective microlens 20a, and this additional thickness is lacking in alternate microlenses 20a' of the first microlens array 17a.

As an alternative to the phase shifting device 25 shown in FIGS. 9a-c, which is integrated in a respective microlens array 17a,b, the phase shifting device 25 can be embodied as a separate component, for example in the form of a phase shifter plate. Such a phase shifter plate (not illustrated) comprises alternating first and second passing elements, which are flush with the microlenses 20a-c or the associated bundles of rays 26. Consequently, the passing elements have a width in the X-direction that corresponds to the aperture or the grid spacing p. The first passing elements in this case generate a phase offset of 0 (zero) of their entire width in the X-direction and the second passing elements in this case generate a phase offset of π over their entire width in the X-direction.

In this case, the phase shifting device 25 can, where necessary, be taken out of the beam path (for instance, pulled out in the X-direction) or be reintroduced into the beam path, depending on whether an odd or even number N of laser beams 3.1, ..., 3.N should be combined in coherent fashion. To this end, provision can also be made of a motor-driven adjustment mechanism, which is driven with the aid of the electronic control unit 15. In general, the phase shifting device 25 is preferably approximately placed into the focal plane of a respective microlens array 17a-c (or of a respective sub-aperture), or else directly behind the first microlens array 17c of the beam path emanating from the emission surfaces 8.1, ..., 8.N.

Figure 10:
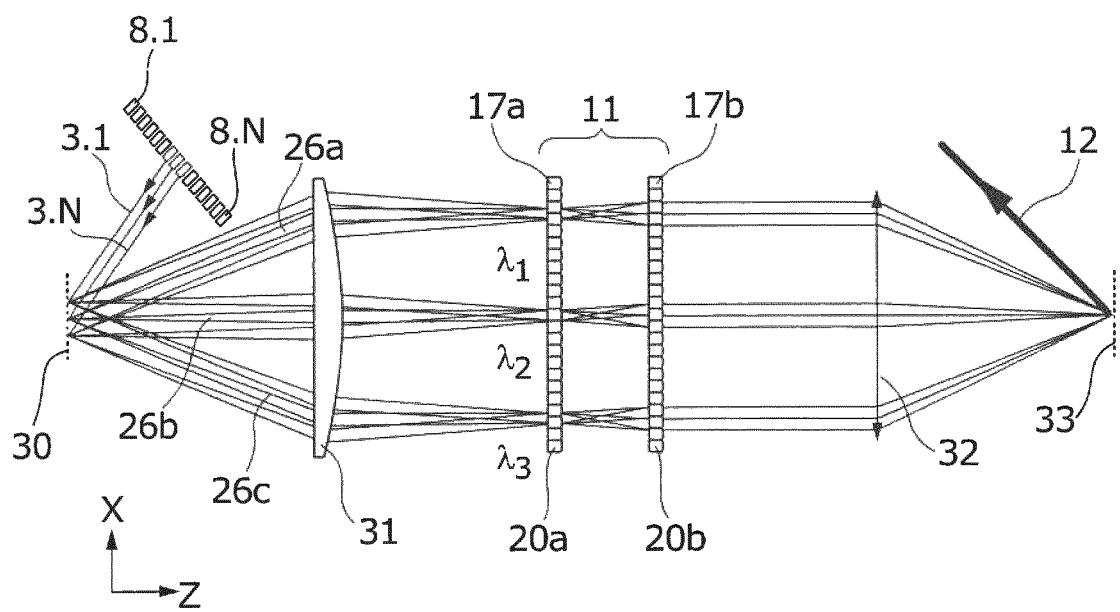
FIG. 10 shows illustrations of a beam combination device which comprises two diffraction gratings and an aspherical lens for the wavelength-dependent correction during the coherent combination of USP laser beams.

FIG. 10 shows an apparatus 16 which is embodied for the wavelength-dependent correction during the superposition of ultrashort pulse laser beams 3.1, ..., 3.N. The apparatus 16 comprises a number of emission surfaces 8.1, ..., 8.N for emitting the coherent laser beams 3.1, ..., 3.N, of which only three laser beams 3.1, 3.2, 3.3 are illustrated in FIG. 10 for simplification purposes, said laser beams being incident on a first wavelength-dispersive element in the form of a first diffraction grating 30. The laser beams 3.1, 3.2, 3.3 are spectrally split at the first diffraction grating 30 and, in the example shown, form three bundles of rays 26a-c with different wavelengths $\lambda_1$, $\lambda_2$, $\lambda_3$ in each case. The three bundles of rays 26a-c pass through a collimation lens 31 and subsequently, with the parallel alignment, pass through the microlens arrangement 11. Here, the three bundles of rays 26a-c pass through respectively different microlenses 20a, 20b of the respective microlens array 17a,b and consequently in separated fashion when passing through the two microlens arrays 17a,b of the microlens arrangement 11. A focusing lens 32 positioned downstream of the microlens arrangement 11 in the beam path focuses the bundles of rays 26a-c on a second wavelength-dispersive optical element in the form of a second diffraction grating 33, which spectrally combines the bundles of rays 26a-c and which generates the combined laser beam 12, the wavelength spectrum of which corresponds to that of the coherent laser beams 3.1, 3.2, 3.3 prior to the superposition.

In the example shown, the input coupling optical unit 18 is formed by the collimation lens 31, which is embodied as an aspherical lens and which has locally variable curvature in the X-direction, i.e., transversely to the propagation direction of the bundles of rays 26a-c. Here, the curvature of the aspherical collimation lens 31 is chosen in spatially dependent fashion in such a way that there can be a wavelength-dependent correction of the phase fronts when combining the USP laser beams 3.1, 3.2, 3.3. However, as a rule, such a wavelength-dependent correction is only required for the case where a comparatively large number of USP laser beams 3.1, ..., 3.N (e.g., with N>10) are intended to be coherently superposed.

Figure 11:
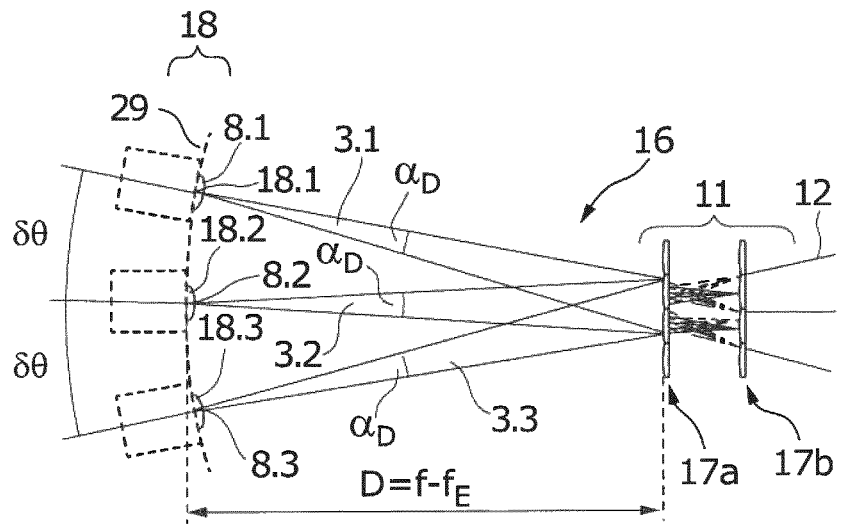
FIG. 11 shows an illustration of a beam combination device analogous to FIG. 7, which comprises a beam shaping optical unit for shaping coherent laser beams, which enter the microlens arrangement with a respective specified divergence angle.

FIG. 11 shows an apparatus 16 analogous to FIG. 7, in which the emission surfaces 8.1, 8.2, 8.3 are arranged on a circular arc 29. As described further above in conjunction with FIG. 7, the emission surfaces 8.1, 8.2, 8.3 are aligned at a respective difference angle $\delta\theta = \lambda_L / p$ with respect to one another. The input coupling optical unit 18 comprises three beam shaping optical units in the form of three lenses 18a-c, which are arranged at the output coupling unit of the emitter surfaces 8.1, 8.2, 8.3. The lenses 18a-c serve to generate a specified divergence angle $\alpha_D$, with which the coherent laser beams 3.1, 3.2, 3.3 enter the microlens arrangement 11. In the case where lenses 18a-c each have the same focal length f, the condition $D = f - f_E$ applies to the distance D between the circular arc 29 and the microlens arrangement 11, where $f_E$ denotes the effective focal length of the microlens arrangement 11. By way of the beam expansion with the aid of the lenses 18a-c or with the aid of a different beam shaping optical unit, for example with the aid of two or more lenses arranged in succession, it is possible to reduce the distance D in relation to the case where use is made of a Fourier lens or a focusing device 19 (cf. FIG. 6) with a (longer) focal length $f_2$ ($L2 = f_2 - f_E = f_2 - p^2/(\lambda_L N)$) and the structure of the apparatus 16 can be realized in more compact fashion overall, reducing the susceptibility to errors.

By way of a targeted specification of the divergence angles am of the coherent laser beams 3.1, 3.2, 3.3, it is possible to modify the interference condition not only in such a way that shorter installation distances are realized but, instead, it is also possible to combine an even number or any number of coherent laser beams 3.1, 3.2, 3.3, ... without the phase shifting device 25, described above in conjunction with FIGS. 9a-c, being required to this end.

To combine an even number N of coherent laser beams 3.1, 3.2, 3.3, ..., it is necessary for the beam shaping optical unit 18a-c, more precisely the lenses 18a-c, to have a focal length f that satisfies the following condition:

$$f = p^2/\lambda_L,$$

to be precise independently of the size of the (even) number N of coherent laser beams 3.1, 3.2, 3.3, .... The aforementioned condition placed on the focal length f also represents a lower limit which must not be undershot in the structure shown in FIG. 11, i.e., the following should apply in general (i.e., independently of the number N) to the focal length f: $f = p^2/\lambda_L$.

Should the number of laser beams 3.1, 3.2, . . . to be combined be intended to be varied, the input coupling optical unit 18 in the form of the beam shaping optical unit can be embodied to set a variable divergence angle am and can have, for example, an adjustable focal length f for this purpose.

Figure 12:
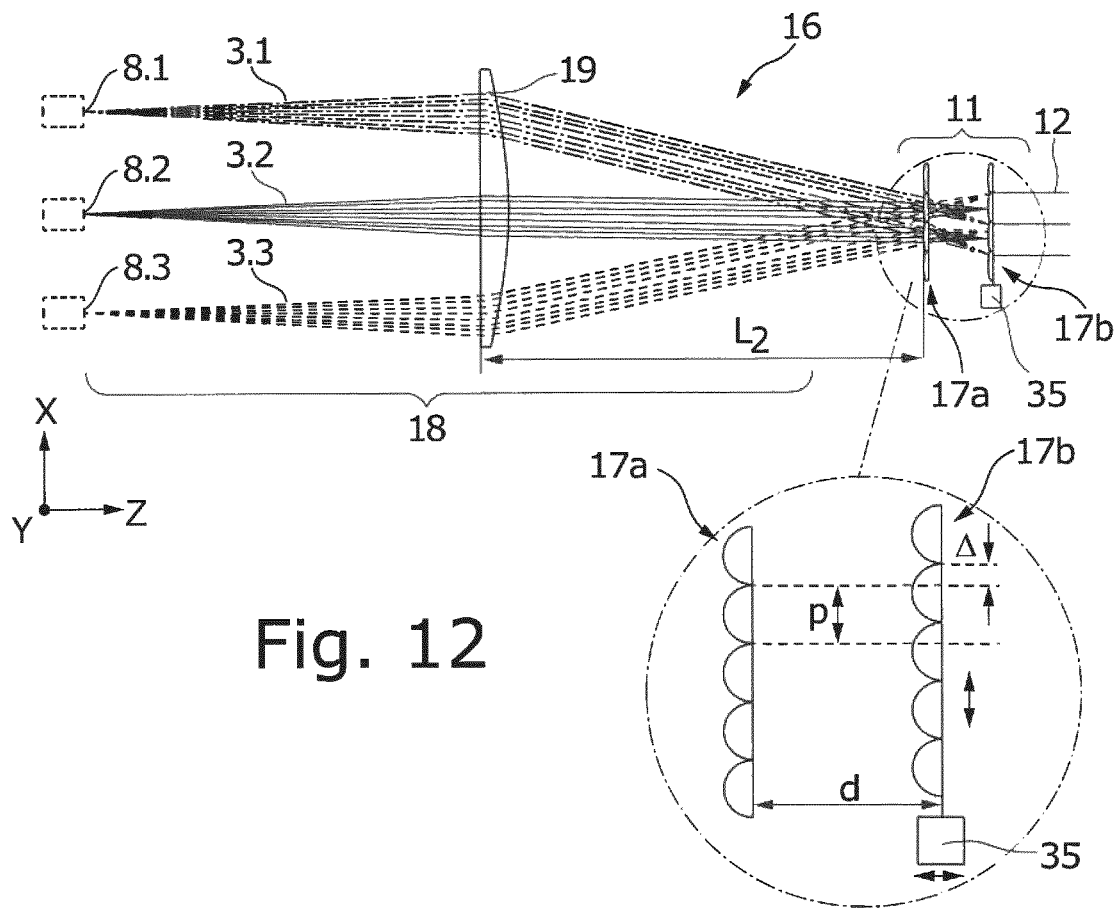
FIG. 12 shows an illustration of a beam combination device analogous to FIG. 6, which comprises a movement device for generating a lateral offset between the second microlens array and the first microlens array.

The combination of an even number of coherent laser beams 3.1, 3.2, . . . to form a combined laser beam 12 is possible not only in the case of the apparatus 16 shown in FIG. 11 but also in the apparatus 16 shown in FIG. 12, which substantially corresponds to the apparatus 16 shown in FIG. 6. The apparatus 16 shown in FIG. 12 comprises a movement device 35 in order to displace the second microlens array 17b in the X-direction, i.e., laterally or transversely to the propagation direction Z of the combined laser beam 12, as a result of which an adjustable lateral offset Δ is generated between the microlenses of the first microlens array 17a and the microlenses of the second microlens array 17b, as can be identified in FIG. 12.

For this purpose, the movement device 35 can comprise, for example, a piezo-element drivable by means of the control device 15, a voice coil, a mechanical drive including a camshaft, etc. The control device 15 can be embodied in the form of a controlling computer or in the form of other suitable hardware and/or software and it drives the movement device 25 to laterally displace the second microlens array 17b.

The apparatus 16 shown in FIG. 12 can also be used to displace the combined laser beam 12 in terms of its position or to alter its angle or to generate two, or possibly more than two, combined laser beams 12a, 12b during the combination, as described below in conjunction with FIGS. 13a-c and FIGS. 14a-c, in which the angle distribution of the far field is respectively displayed in a plane X, Y perpendicular to the propagation direction Z of the combined laser beam 12.

Figure 13A:
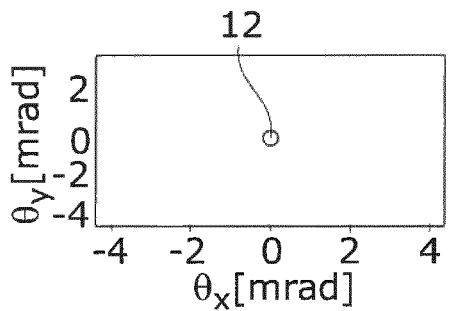
FIG. 13a-c show illustrations of the far field of the beam combination device of FIG. 12 without and with a lateral offset of two microlens arrays for deflecting the combined laser beam.
Figure 13B:
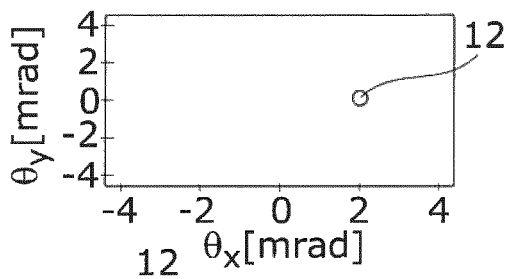
Figure 13C:
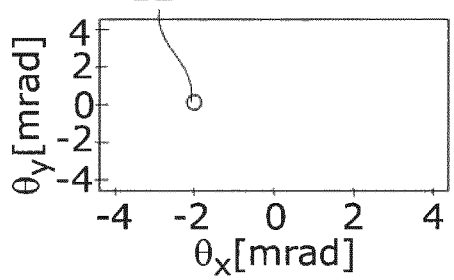

FIG. 13a shows the case where no lateral offset Δ is generated between the two microlens arrays 17a,b, i.e., where the following applies: Δ=0 mm. In this case, the combined laser beam 12 is diffracted into the 0-th order of diffraction, and so the latter is not deflected and propagates along the optical axis in the Z-direction. FIG. 13b shows the case where a positive lateral offset Δ (displacement in the positive X-direction; cf. FIG. 12) is set with the aid of the movement device 35, the following applying to the presently described case of three laser beams 3.1, 3.2, 3.3: Δ=p/N× B=p/3 (in this case: N=3, B=+1). The combined laser beam 12 is deflected into the +1st order of diffraction and consequently does not propagate along the optical axis in the Z-direction; instead, it is deflected at an angle θx of approximately +2 mrad in the positive X-direction. FIG. 13c shows the analogous case when a lateral offset Δ with a negative sign (Δ=−p/N×B=−p/3 (in this case: N=3, B=−1)) is generated in order to deflect the combined laser beam 12 into the −1st order of diffraction such that the latter is deflected at an angle θx of approximately −2 mrad in the negative X-direction.

Figure 14A:
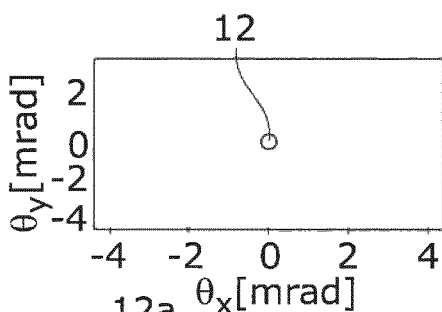
FIG. 14a-c show illustrations of the far field of the beam combination device of FIG. 12 without and with a lateral offset of two microlens arrays for forming two combined laser beams.
Figure 14B:
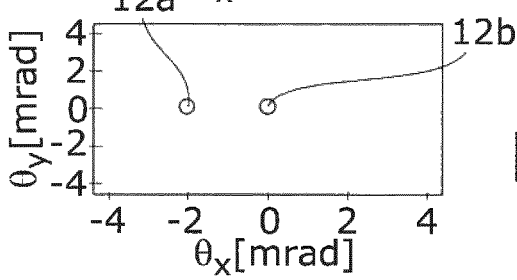
Figure 14C:
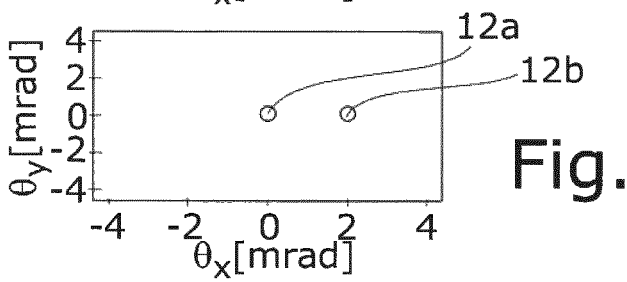

FIG. 14a shows the case analogous to FIG. 13a where no lateral offset Δ is generated between the two microlens arrays 17a,b, i.e., where the following applies: Δ=0 mm, and so the combined laser beam 12 is not deflected and propagates along the optical axis in the Z-direction. FIG. 14b shows the case where a positive lateral offset Δ (displacement in the positive X-direction; cf. FIG. 12) is set with the aid of the movement device 35, the following applying to the presently described case of three laser beams 3.1, 3.2, 3.3: Δ=+p/(2N)=p/6 (in this case: N=3). The combined laser beam 12 is divided in the case of such choice of lateral offset Δ; more precisely, two combined laser beams 12a, 12b with the same power are generated, the first laser beam 12a of which propagates, like in FIG. 14a, in the Z-direction while the second laser beam 12b is diffracted into the −1st order of diffraction. Accordingly, a negative lateral offset Δ (displacement in the negative X-direction) is set in the example shown in FIG. 14c, the following applying thereto in the case of three laser beams 3.1, 3.2, 3.3 as described in the present case: Δ=−p/(2N)=−p/6 (in this case: N=3). In this case, too, two combined laser beams 12a, 12b with the same power are generated, the first laser beam 12a of which propagates, like in FIG. 14a, in the Z-direction while the second laser beam 12b is diffracted into the +1st order of diffraction.

In the case of a suitable choice of the absolute value of the lateral offset Δ, the deflection shown in FIGS. 13b,c can also be combined with the split into or formation of two, or possibly more than two, combined laser beams 12a, 12b, . . . as shown in FIGS. 14b,c. In this case, too, the laser power and the beam quality of the coherent laser beams 8.1, 8.2, 8.3 can largely be maintained; i.e., the losses even in the case of a diffraction into the 2nd order of diffraction are only approximately 10%. It is understood that even more than three laser beams 3.1, 3.2, 3.3 can be deflected or split in the manner described further above, which laser beams originate from one laser source 2 or possibly from a plurality of coherent laser sources 2.

With the aid of the apparatus 16 shown in FIG. 12, it is also possible to combine an even number N of coherent laser beams 3.1, 3.2, . . . to form a combined laser beam 12, without the phase shifting device 25 described further above having to be used for this purpose. To this end, a lateral offset Δ is set, to which the following applies:

$$\Delta = \pm p/(2N+1),$$

where N+1 denotes the (odd) number of coherent laser beams 3.1, 3.2, . . . which can be combined to form a combined laser beam 12 by means of the apparatus 16. In this case, the following applies to the distance d, shown in FIG. 12, between the first microlens array 17a and the second microlens array 17b:

$$d = p^2/(N\lambda_L).$$

The distance d between the first and the second microlens array 17a, 17b can be constant. Alternatively, the distance d can be adjustable. To this end, the second microlens array 17b, for example, can be carried by a carriage, the position of which in the Z-direction is set by way of a motor-driven adjustment mechanism with the aid of the programmable control device 15, as is illustrated further above in conjunction with FIGS. 3a,b.

Should a plurality of laser beams 3.1.1 to 3.N.M be combined in two-dimensional fashion, as described further above in conjunction with FIGS. 8a-c, the movement device 35 can be embodied to set a lateral offset $\Delta_X$ in the X-direction and, independently thereof, a lateral offset $\Delta_Y$ in the Y-direction in the microlens arrangement 11 shown in FIG. 8c, which comprises two pairs of crossed, one-dimensional microlens arrays 17a-d. To this end, the movement device 35 can act on the first microlens array 17a, for example, in order to offset the latter laterally in the X-direction and act accordingly on the second microlens array 17b in order to offset the latter laterally in the Y-direction. In this way, the deflection or the combination to form two laser beams 12a,b can be implemented independently of one another in both directions (X,Y).

Should two-dimensionally structured microlens arrays 17a, 17b be used for the two-dimensional combination of the coherent laser beams 3.1.1 to 3.N.M, as shown in FIGS. 8a,b, however, independent setting in two directions is not possible. If such a two-dimensionally structured microlens array, e.g., the first microlens array 17a, is laterally offset in one direction (e.g., X-direction), the combined laser beam 12 is also deflected in the second direction (e.g., Y-direction) or four combined laser beams are formed instead of two combined laser beams 12a,b.

In summary, a coherent combination of a plurality N of laser beams 3.1, ..., 3.N can be implemented in the manner described above with the aid of standard optical units, i.e., —with the exception of the example shown in FIG. 10—without the use of diffractive optical elements or the like. By way of a suitable choice of the focal lengths $f_a$, $f_b$, $f_c$ of the microlenses 20a-c of the microlens arrays 17a-c, possibly in combination with a suitable choice of the focal length(s) $f_2$, $f_1$ of optical elements 19, 21 of the input coupling optical unit 18, and by way of a suitable choice of the relative phases $\delta\varphi_n(x)$ of the laser beams 3.1, ..., 3.N, it is possible to obtain a high efficiency in the coherent combination to form the combined laser beam 12 while simultaneously maintaining the beam quality.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for combining a plurality of coherent laser beams, the apparatus comprising:
    at least N−1 phase setting devices configured to set a respective phase ($\delta\varphi_n$) of a respective one of the plurality of coherent laser beams; and
    a beam combination device configured to combine the plurality of coherent laser beams to form at least one combined laser beam, the beam combination device including a microlens arrangement having at least two microlens arrays configured to form the at least one combined laser beam;
    wherein the respective phase ($\delta\varphi_n$) of the respective one of the plurality of coherent laser beams is given by:

$$\delta\varphi_n = -(2\pi/\lambda_L)f_E(m_n\lambda_L/p)^2,$$

wherein N denotes a number of the plurality of coherent laser beams, n denotes an index for an n-th coherent laser beam, p denotes a grid spacing of microlenses of a respective microlens array, $f_E$ denotes an effective focal length of the microlens arrangement, and $\lambda_L$ denotes a laser wavelength, and wherein the following applies:

$$m_n = -\frac{(N+1)}{2} + n.$$

2. The apparatus as claimed in claim 1, wherein the plurality of coherent laser beams and the microlens arrangement satisfy the following condition:

$$N = p^2/(\lambda_L f_E).$$

3. The apparatus as claimed in claim 1, wherein the microlens arrangement comprises at least three microlens arrays and is configured to set the effective focal length ($f_E$).

4. The apparatus as claimed in claim 3, wherein the microlens arrangement is configured to alter a distance between at least a first microlens array and a second microlens array for setting the effective focal length.

5. The apparatus as claimed in claim 1, further comprising: a movement device configured to generate a lateral offset between a first microlens array and a second microlens array of the microlens arrangement.

6. The apparatus as claimed in claim 5, wherein the first microlens array and the second microlens array have a lateral offset Δ for forming two combined laser beams, wherein the following applies to the lateral offset:

$$\Delta = \pm p/(2N).$$

7. The apparatus as claimed in claim 5, wherein the first microlens array and the second microlens array have a lateral offset Δ for combining an even number N of coherent laser beams to form the at least one combined laser beam, the following applying to the lateral offset:

$$\Delta = \pm p/(2N+1), \text{ and}$$

wherein the following applies to a distance d between the first microlens array and the second microlens array:

$$d = p^2/(N\lambda_L).$$

8. The apparatus as claimed in claim 1, wherein a first microlens array and a second microlens array of the microlens arrangement have a lateral offset Δ for forming the at least one combined laser beam that is diffracted into an order of diffraction B that differs from zero, the following applying to the lateral offset:

$$\Delta = p/NB.$$

9. The apparatus as claimed in claim 1, further comprising: an input coupling optical unit configured to couple the plurality of coherent laser beams into the microlens arrangement, wherein the input coupling optical unit is configured to couple into the microlens arrangement adjacent coherent laser beams with a specified angle difference δθ, wherein the following applies:

$$\delta\theta = \lambda_L/p.$$

10. The apparatus as claimed in claim 9, wherein the input coupling optical unit comprises at least one focusing lens configured to focus the plurality of coherent laser beams on the microlens arrangement.

11. The apparatus as claimed in claim 10, wherein the input coupling optical unit comprises at least one further lens configured to correct a phase front ($\delta\varphi_n(x)$) of the plurality of coherent laser beams.

12. A laser system, comprising:
an apparatus as claimed in claim 1;
at least one laser source configured to generate the plurality of coherent laser beams; and
a plurality of emission surfaces configured to emit the plurality of coherent laser beams,
wherein the apparatus as claimed in claim 1 is configured to combine the plurality of coherent laser beams to form the combined laser beam.

13. The laser system as claimed in claim 12, wherein the emitted coherent laser beams have a Gaussian beam profile, a donut-shaped beam profile, or a top hat beam profile.

14. The laser system as claimed in claim 12, further comprising: a control device configured to set the effective focal length ($f_E$) of the microlens arrangement based on a number N of the plurality of emitted coherent laser beams.

15. The laser system as claimed in claim 14, further comprising a focusing device, wherein a distance between the focusing device and the microlens arrangement is adjustable, and wherein the control device is configured to set the distance based on the number N of the plurality of emitted coherent laser beams.

16. The laser system as claimed in claim 12, further comprising a focusing device and an imaging optical unit, wherein the focusing device is arranged at a distance from a first microlens array of the microlens arrangement, wherein the distance is equal to a focal length $f_2$ of the focusing device, and wherein the focal length $f_2$ of the focusing device, a focal length $f_1$ of the imaging optical unit, and an effective focal length $f_E$ of the microlens arrangement satisfy the following condition:

$$f_1 = -f_2^2/f_E.$$

17. The laser system as claimed in claim 16, wherein the focal length ($f_1$) of the imaging optical unit is adjustable and the control device is configured to set the focal length ($f_1$) of the imaging optical unit based on the number N of coherent laser beams.

18. The laser system as claimed in claim 12, further comprising a focusing device, wherein adjacent emission surfaces are arranged equidistantly and have a distance $\delta x$ from one another that is given by $$\delta x = \lambda_L f_2/p,$$

where $f_2$ denotes a focal length of the focusing device.

19. The laser system as claimed in claim 12, wherein adjacent emission surfaces are arranged equidistantly on a circular arc and are aligned to couple into the microlens arrangement adjacent coherent laser beams with a specified angle difference $\delta\theta$, wherein the following applies:

$$\delta\theta = \lambda_L/p.$$

20. The laser system as claimed in claim 12, further comprising an input coupling optical unit, wherein the input coupling optical unit comprises or forms a beam shaping optical unit configured to shape a respective coherent laser beam with a specified divergence angle ($\alpha_D$) upon input coupling into the microlens arrangement.

21. The laser system as claimed in claim 20, wherein the plurality of emission surfaces comprises an even number N of emission surfaces, wherein the beam shaping optical unit has a focal length f that satisfies the following condition:

$$f = p^2/\lambda_L.$$

22. The laser system as claimed in claim 12, wherein the plurality of emission surfaces comprises an even number N of emission surfaces, wherein the microlens arrangement comprises a phase shifting device configured to generate a constant phase offset of $\pi$ between bundles of rays of the coherent laser beams that pass through adjacent microlenses of a respective microlens array.

23. The laser system as claimed in claim 12, further comprising:
a first wavelength-dispersive element arranged in front of the microlens arrangement and configured to spectrally split the coherent laser beams into a plurality of bundles of rays that pass separately through the microlens arrangement, and
a second wavelength-dispersive optical element arranged after the microlens arrangement and configured to spectrally combine the plurality of bundles of rays to form the combined laser beam with a laser wavelength ($\lambda_L$).

24. The laser system as claimed in claim 23, further comprising an input coupling optical unit, wherein the input coupling optical unit comprises a collimation lens configured as an aspherical lens.

25. A method for combining a number of coherent laser beams to form at least one combined laser beam, the method comprising:
coupling the coherent laser beams into a microlens arrangement comprising at least two microlens arrays;
setting a phase $\delta\varphi_n$ of an n-th coherent laser beam given by:

$$\delta\varphi_n = -(2\pi/\lambda_L) f_E (m_n \lambda_L/p)^2,$$

where wherein p denotes a grid spacing of microlenses of a respective microlens array, $f_E$ denotes an effective focal length of the microlens arrangement, and $\lambda_L$ denotes a laser wavelength, wherein the following applies:

$$m_n = -\frac{(N+1)}{2} + n,$$

wherein N denotes the number of the coherent laser beams; and
combining the coherent laser beams to form the at least one combined laser beam in the microlens arrangement.

26. The method as claimed in claim 25, wherein the effective focal length $f_E$ of the microlens arrangement satisfies the following condition:

$$f_E = p^2/(\lambda_L N).$$

27. The method as claimed in claim 25, wherein the coupling is implemented by using an input coupling optical unit comprising a focusing device, the method further comprising:
setting a distance L2 between the focusing device and the microlens arrangement given by:

$$L2 = f_2 - p_2/(N\lambda_L),$$

wherein $f_2$ denotes a focal length of the focusing device.

28. The method as claimed in claim 25, wherein the coupling is implemented by using an input coupling optical unit comprising a focusing device and an imaging optical unit, the method further comprising:

setting a focal length $f_1$ of the imaging optical unit given by:

$$f_1 = -f_2^2/f_E,$$

where $f_2$ denotes a focal length of the focusing device.

* * * * *